(12) United States Patent
Jain et al.

(10) Patent No.: US 10,720,836 B2
(45) Date of Patent: Jul. 21, 2020

(54) CONVERTER DEVICE AND METHOD TO OPERATE SAID CONVERTER DEVICE

(71) Applicant: Würth Elektronik eiSos GmbH & Co. KG, Waldenburg (DE)

(72) Inventors: Parth Jain, Dundas (CA); Aleksandar Prodic, Toronto (CA); Alexander Gerfer, Odenthal (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 0 days.

(21) Appl. No.: 16/085,708

(22) PCT Filed: Mar. 15, 2017

(86) PCT No.: PCT/EP2017/056124
§ 371 (c)(1),
(2) Date: Sep. 17, 2018

(87) PCT Pub. No.: WO2017/158022
PCT Pub. Date: Sep. 21, 2017

(65) Prior Publication Data
US 2019/0097536 A1 Mar. 28, 2019

(30) Foreign Application Priority Data

Mar. 18, 2016 (EP) .................................. 16161038

(51) Int. Cl.
*H02M 3/158* (2006.01)
*H02M 3/156* (2006.01)
*H02M 3/157* (2006.01)

(52) U.S. Cl.
CPC ........... *H02M 3/158* (2013.01); *H02M 3/156* (2013.01); *H02M 3/157* (2013.01); *H02M 2003/1586* (2013.01)

(58) Field of Classification Search
CPC ...... H02M 3/158; H02M 3/157; H02M 3/156; H02M 2003/1586
See application file for complete search history.

(56) References Cited

U.S. PATENT DOCUMENTS

2008/0019158 A1    1/2008   Wu et al.
2008/0159567 A1    7/2008   Lesso et al.
(Continued)

FOREIGN PATENT DOCUMENTS

CN         105075085 A    11/2015
RU         2462807 C1    9/2012
(Continued)

OTHER PUBLICATIONS

Behzad Mahdavikhah et al., Digitally controlled multi-phase buck-converter with merged capacitive attenuator, Applied Power Electronics Conference and Exposition (APEC), 2012 Twenty-Seventh Annual IEEE, IEEE, Feb. 5, 2012, pp. 1083-1087.
(Continued)

*Primary Examiner* — Adolf D Berhane
*Assistant Examiner* — Afework S Demisse
(74) *Attorney, Agent, or Firm* — McGlew and Tuttle, P.C.

(57) ABSTRACT

A converter device includes a converter and a controller to operate the converter. The converter includes reactive components which include a flying capacitor. To perform at least two different operation modes, the converter further includes seven switches. A mode selection logic of the controller selects one of the operation modes depending on desired operating conditions. The converter device is highly flexible and enables a high power processing efficiency over the full operating range by properly selecting a suitable operation mode.

15 Claims, 16 Drawing Sheets

(56) References Cited

U.S. PATENT DOCUMENTS

2011/0204862 A1\* 8/2011 Prodic .................. H02M 3/158
 323/282
2014/0022006 A1 1/2014 Lin et al.
2015/0358486 A1 12/2015 Wimpenny

FOREIGN PATENT DOCUMENTS

TW 201405274 A 2/2014
WO 2016/011380 A1 1/2016

OTHER PUBLICATIONS

"Wide-Range 7-Switch Flying Capacitor Based DC-Dcconverter for Point-of-Load Applications", Parth Jain, Master's thesis, University of Toronto, 2015.

\* cited by examiner $ST_1$
$0 < t < DT_s$ $ST_2$ (& $ST_4$)
$DT_s < t < T_s/2$
($T_s/2 + DT_s < t < T_s$)

ST₃
$T_S/2 < t < DT_S + T_S/2$

ST₁
$0 < t < DT_s$

ST₂ (& ST₄)
$DT_s < t < T_s/2$
$(T_s/2 + DT_s < t < T_s)$

ST₃
$T_S/2 < t < DT_S + T_S/2$ $ST_1$ (& $ST_3$)
$0 < t < (D-1/2)T_S$
$(T_S/2 < t < T_S/2 + (D-1/2)T_S)$ $ST_2$
$(D-1/2)T_S < t < T_S/2$

ST₄
$T_S/2+(D-1/2)T_S < t < T_S$ $ST_1$
$0 < t < DT_S$ $ST_2$ (& $ST_4$)
$DT_S < t < T_S/2$
($T_S/2 + DT_S < t < T_S$)

ST₃
$T_S/2 < t < DT_S+T_S/2$ $ST_1$
$0 < t < DT_S$ $ST_2$ (& $ST_4$)
$DT_S < t < T_S/2$
($T_S/2+DT_S < t < T_S$)

ST$_3$
$T_S/2 < t < DT_S + T_S/2$

ST₁
0 < t < DT_S

ST₂
DT_S < t < T_S

CONVERTER DEVICE AND METHOD TO OPERATE SAID CONVERTER DEVICE

CROSS REFERENCE TO RELATED APPLICATIONS

This application is a United States National Phase Application of International Application PCT/EP2017/056124 filed Mar. 15, 2017 and claims the benefit of priority under 35 U.S.C. § 119 of European Patent Application Serial No. 16 161 038.1 filed Mar. 18, 2016, the entire contents of which are incorporated herein by reference.

FIELD OF THE INVENTION

The invention relates to a converter device for converting an input voltage into an output voltage, comprising a converter comprising a first input voltage terminal and a second input voltage terminal to apply the input voltage, a first output voltage terminal and a second output voltage terminal to provide the output voltage to a load, and reactive components, and comprising a controller to operate the converter.

Furthermore, the invention relates to a method to operate a converter device.

BACKGROUND OF THE INVENTION

In electronics devices point-of-load (PoL) DC-DC converters are needed to provide regulated DC voltages to various functional blocks in a system. Generally, these functional blocks require different voltage and power levels and, therefore, dedicated PoL converters are used for each block. For these systems, custom designs of the buck converter are used as the PoL converter of choice. The use of custom buck converters allows the designer to maximize efficiency and to minimize volume for each buck converter and to optimize the full system performance. However, custom buck converters increase the system-level design complexity and manufacturing costs and affect reliability. US 2008/0019158 A1 discloses for example a conventional two-phase interleaved buck converter.

SUMMARY OF THE INVENTION

It is an object of the present invention to provide a highly flexible converter device that is able to provide a large range of voltages, conversion ratios and power levels with a high power processing efficiency, a low volume and a good dynamic performance.

This object is achieved by a converter device for converting an input voltage into an output voltage, in which the converter comprises seven switch-es to perform at least two different operation modes, the reactive components comprise a flying capacitor, and the controller comprises a mode selection logic to select one of the operation modes depending on desired operating conditions. The inventive converter device operates on the principle of transformability, which refers to its ability to choose its mode of operation based on operating conditions. This mode changing characteristic is enabled by seven switches, a flying capacitor and a controller. The controller is in particular a digital controller. The converter in particular comprises exactly seven switches to enable the different operation modes on the one hand and to avoid unnecessary losses on the other hand. Due to the seven switches and the flying capacitor the inventive converter device is in the following also called 7-switch flying capacitor converter device or 7SFC converter device. Correspondingly, the inventive converter is also called 7-switch flying capacitor converter or 7SFC converter. Depending on the operating conditions, the converter device can operate in various operation modes, maximizing efficiency throughout the entire operating range. The operating conditions are characterized by at least one of the input voltage, the output voltage, a required output voltage, an output current, a required output current, a conversion ratio or a duty ratio. For example, at least two of the following operation modes can be provided: high step-down mode, 3-level buck mode, two-phase interleaved buck mode, single-phase 3-level buck mode and single-phase interleaved buck mode. The operation mode with the highest efficiency is selected by the mode selection logic. For example, the mode selection logic comprises a look-up table with predefined voltage thresholds and current thresholds. The converter device is at least one of a step-up converter device or a step-down converter device.

In case the converter device is operated as step-down converter device, there applies to a conversion ratio $M=V_{out}/V_{in}$: $1/24 \leq M \leq 1$, preferably $1/48 \leq M \leq 1$, preferably $1/80 \leq M \leq 1$.

Furthermore, in case the converter device is operated as step-up converter device, there applies to the conversion ratio M: $1 \leq M \leq 24$, preferably $1 \leq M \leq 48$, preferably $1 \leq M \leq 80$.

The converter device is operated at a switching frequency $f_s$. For example, there applies to the switching frequency: 200 kHz $\leq f_s \leq$ 1600 kHz, preferably 400 kHz $\leq f_s \leq$ 1400 kHz, preferably 600 kHz $\leq f_s \leq$ 1200 kHz.

Furthermore, there applies for example to a load current $I_{load}$: 0.1 A $\leq I_{load} \leq$ 10 A, preferably 0.5 A $\leq I_{load} \leq$ 8 A and preferably 1 A $\leq I_{load} \leq$ 6 A.

A power processing efficiency of the converter device is defined as the ratio of the output power and the input power. The power processing efficiency depends on the conversion ratio M, the switching frequency $f_s$ and/or the load current $I_{load}$. The power processing efficiency is at least 75%, preferably at least 80%, preferably at least 85%, and preferably at least 90% for the entire range of operating conditions. The converter device maintains a high and almost flat efficiency curve for the entire range of operating conditions.

A converter device, in which a first switch is arranged between one of the first voltage terminals and a first node, a second switch is arranged between a second node and a reference node, a third switch is arranged between the second node and a third node, a fourth switch is arranged between the first node and a fourth node, a fifth switch is arranged between the fourth node and a fifth node, a sixth switch is arranged between the fifth node and the reference node, and a seventh switch is arranged between the third node and the fourth node, ensures a high degree of flexibility. The arrangement of the seven switches allows the inventive two-phase DC-DC converter to perform various different operation modes. Furthermore, the converter device enables a reduction of voltage stress across the reactive components to half of the input voltage in case of a step-down converter device or to half of the output voltage in case of a step-up converter device. The second input voltage terminal and the second output voltage terminal are in particular connected to the reference node. The reference node is in particular connected to ground.

A converter device, in which the flying capacitor which is arranged between a first node and a second node, ensures a high power processing efficiency due to a reduction in switching losses and voltage stress. The voltage across the flying capacitor is equal to half of the input voltage in case of a step-down converter device or half of the output voltage in case of a step-up converter device for certain operation modes. This enables a reduced voltage stress of the switches and the reactive components and a reduced volume of the reactive components. Furthermore, the switching losses of the switches are reduced.

A converter device, in which the reactive components comprise a first inductor which is arranged between a third node and one of the first voltage terminals and a second inductor which is arranged between a fifth node and said one first voltage terminal, ensures a high degree of flexibility. Both inductors can be operated in parallel. This allows the load current to be split between the two inductors, reducing the volume requirement and losses of the inductors.

A converter device, in which the reactive components comprise a capacitor which is arranged in parallel to one of the first voltage terminals and the associated second voltage terminal, ensures a high degree of flexibility. In case of a step-down converter device the output capacitor enables to adapt the output voltage ripple and the deviation of the output voltage to a desired value. The capacitor is in particular connected to the reference node.

A converter device, in which the controller comprises switch operation means which are connected with the mode selection logic to receive a mode signal and to operate the switches dependent on the selected opera-tion mode, ensures a high degree of flexibility. The switch operation means provide switching signals to operate the switches dependent on the selected operation mode, namely the operation mode provided by the mode signal of the mode selection logic. The switch operation means comprise in particular a digital pulse width modulator.

A converter device, in which the digital controller comprises a voltage controller which is connected to the switch operation means to provide a duty ratio and to operate the switches dependent on the duty ratio, enables to provide a regulated output voltage. The voltage controller provides the switch operation means with a duty ratio to operate the switches dependent on said duty ratio. The output voltage is measured by a voltage sensor and preferably transferred into the digital domain by a corresponding analog-to-digital converter. A digital voltage compensator is provided with an error signal which is the difference of a desired digital output voltage and the measured digital output voltage. The output signal of the digital voltage compensator is the duty ratio D. The duty ratio D is the ratio of a pulse duration T and a switching period $T_s$. There applies to the duty ratio: $0 \leq D \leq 1$, in particular $0 < D < 1$.

A converter device, in which the mode selection logic comprises at least three signal inputs to receive the input voltage, the output voltage and the output current, ensures a high degree of flexibility and a high power processing efficiency. Based on signals, preferably digital signals of the input voltage, the output voltage and the output current the mode selection logic determines a suitable operation mode. For example, the mode selection logic uses a look-up table to provide a mode signal to the switch operation means which characterizes a suitable operation mode. In addition, the voltage compensator can be designed with different parameters, depending on the operation mode to achieve an optimized dynamic performance for each operation mode.

A converter device, in which the switch operation means comprise a first switching sequence to perform a first operation mode as follows:

|     | $ST_1$ | $ST_2$ | $ST_3$ | $ST_4$ |
|-----|--------|--------|--------|--------|
| $SW_1$ | 1 | 0 | 0 | 0 |
| $SW_2$ | 0 | 1 | 1 | 1 |
| $SW_3$ | 1 | 1 | 1 | 1 |
| $SW_4$ | 0 | 0 | 1 | 0 |
| $SW_5$ | 0 | 1 | 1 | 1 |
| $SW_6$ | 1 | 1 | 0 | 1 |
| $SW_7$ | 1 | 1 | 0 | 1 | wherein
$SW_1$ to $SW_7$ denote the seven switches,
$ST_1$ to $ST_4$ denote four states of a switching cycle,
0 means OFF and 1 means ON,
ensures a high power processing efficiency for high step-down ratios under medium and heavy load conditions. This operation mode is called high step-down (HSD) mode. This mode provides the highest efficiency for high step-down cases. In steady-state, the voltage across the flying capacitor is equal to half of the input voltage of the converter. That means that all switches can be rated at half of the full input voltage. The benefits of a lower voltage rating for each switch are a reduced volume and reduced switching losses.

A converter device, in which the switch operation means comprise a second switching sequence to perform a second operation mode as follows:

|     | $ST_1$ | $ST_2$ | $ST_3$ | $ST_4$ |
|-----|--------|--------|--------|--------|
| $SW_1$ | 1 | 0 | 0 | 0 |
| $SW_2$ | 0 | 1 | 1 | 1 |
| $SW_3$ | 1 | 1 | 0 | 1 |
| $SW_4$ | 0 | 0 | 1 | 0 |
| $SW_5$ | 1 | 1 | 1 | 1 |
| $SW_6$ | 0 | 1 | 0 | 1 |
| $SW_7$ | 1 | 1 | 1 | 1 | wherein
$SW_1$ to $SW_7$ denote the seven switches,
$ST_1$ to $ST_4$ denote four states of a switching cycle,
0 means OFF and 1 means ON,
ensures a high power processing efficiency under light load conditions for cases when a high step-down conversion is required. This mode is called 3-level buck (3LB) mode. This mode is operated with both inductors in parallel by keeping the fifth switch and the seventh switch on over the full switching cycle. This allows the load current to be split between the two inductors, reducing the volume requirement and losses of the inductors. All switches are switched at half of the input voltage, reducing switching losses.

A converter device, in which the switch operation means comprise a third switching sequence to perform a third operation mode as follows:

|     | $ST_1$ | $ST_2$ | $ST_3$ | $ST_4$ |
|-----|--------|--------|--------|--------|
| $SW_1$ | 1 | 1 | 1 | 1 |
| $SW_2$ | 1 | 1 | 1 | 1 |
| $SW_3$ | 0 | 0 | 0 | 1 |
| $SW_4$ | 1 | 1 | 1 | 1 |
| $SW_5$ | 1 | 0 | 1 | 1 |
| $SW_6$ | 0 | 1 | 0 | 0 |
| $SW_7$ | 1 | 1 | 1 | 0 | wherein
$SW_1$ to $SW_7$ denote the seven switches,
$ST_1$ to $ST_4$ denote four states of a switching cycle,
0 means OFF and 1 means ON ensures a high degree of flexibility. This operation mode can be used for conversion ratios close to and greater than 0.5. This mode is called first two-phase interleaved buck ($IB_1$) mode. This mode can be used for a duty ratio D≥0.5.

A converter device, in which the switch operation means comprise a fourth switching sequence to perform a fourth operation mode as follows:

|  | $ST_1$ | $ST_2$ | $ST_3$ | $ST_4$ |
|---|---|---|---|---|
| $SW_1$ | 1 | 1 | 1 | 1 |
| $SW_2$ | 1 | 1 | 1 | 1 |
| $SW_3$ | 0 | 1 | 1 | 1 |
| $SW_4$ | 1 | 1 | 1 | 1 |
| $SW_5$ | 0 | 0 | 1 | 0 |
| $SW_6$ | 1 | 1 | 0 | 1 |
| $SW_7$ | 1 | 0 | 0 | 0 | wherein
$SW_1$ to $SW_7$ denote the seven switches,
$ST_1$ to $ST_4$ denote four states of a switching cycle,
0 means OFF and 1 means ON,
ensures a high degree of flexibility. This operation mode can be used for conversion ratios close to and greater than 0.5. This mode is called second two-phase interleaved buck ($IB_2$) mode. This mode can be used for a duty ratio D≤0.5.

A converter device, in which the switch operation means comprise a fifth switching sequence to perform a fifth operation mode as follows:

|  | $ST_1$ | $ST_2$ | $ST_3$ | $ST_4$ |
|---|---|---|---|---|
| $SW_1$ | 1 | 0 | 0 | 0 |
| $SW_2$ | 0 | 1 | 1 | 1 |
| $SW_3$ | 1 | 1 | 0 | 1 |
| $SW_4$ | 0 | 0 | 1 | 0 |
| $SW_5$ | 0 | 0 | 0 | 0 |
| $SW_6$ | 0 | 0 | 0 | 0 |
| $SW_7$ | 1 | 1 | 1 | 1 | wherein
$SW_1$ to $SW_7$ denote the seven switches,
$ST_1$ to $ST_4$ denote four states of a switching cycle,
0 means OFF and 1 means ON,
ensures a high degree of flexibility. This operation mode enables to perform phase shedding to further increase power processing efficiency at low currents. This operation mode is called single-phase 3-level buck (SP3LB) mode.

A converter device, in which the switch operation means comprise a sixth switching sequence to perform a sixth operation mode as follows:

|  | $ST_1$ | $ST_2$ |
|---|---|---|
| $SW_1$ | 1 | 1 |
| $SW_2$ | 1 | 1 |
| $SW_3$ | 0 | 1 |
| $SW_4$ | 1 | 1 |
| $SW_5$ | 0 | 0 |
| $SW_6$ | 0 | 0 |
| $SW_7$ | 1 | 0 | wherein
$SW_1$ to $SW_7$ denote the seven switches,
$ST_1$ and $ST_2$ denote two states of a switching cycle,
0 means OFF and 1 means ON,
ensures a high degree of flexibility. This operation mode enables to perform phase shedding to further increase power processing efficiency at low currents. This operation mode is called single-phase interleaved buck (SPIB) mode.

Furthermore, it is an object of the present invention to provide a highly flexible method to operate a converter device that is able to provide a large range of voltages, conversion ratios and power levels with a high power processing efficiency, a low volume, and a good dynamic performance.

This object is achieved by a method to operate a converter device comprising the steps of providing a converter device according to the invention, selecting one of the at least two operation modes by means of the mode selection logic depending on desired operating conditions, and operating the switches of the converter to perform the selected operation mode. The advantages of the method according to the invention correspond to the advantages already described of the converter device according to the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
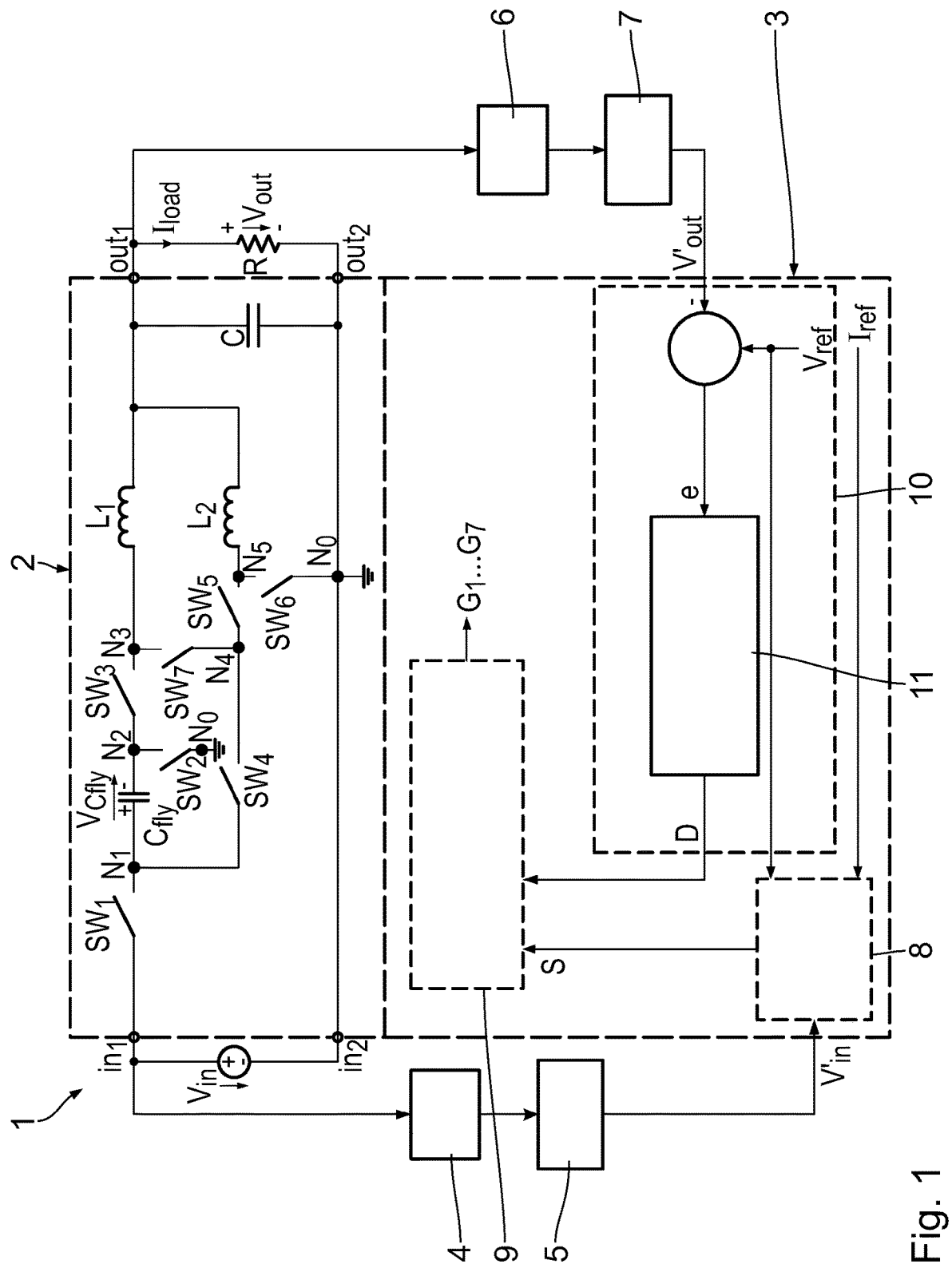
FIG. 1 is a schematic diagram of a converter device with a converter and a digital controller.

FIG. 1 shows a converter device 1 for converting an input voltage $V_{in}$ into an output voltage $V_{out}$. The converter device 1 comprises a converter 2 and a digital controller 3 to operate the converter 2. The converter device 1 is for example used to convert the DC-DC input voltage $V_{in}$ into a smaller DC-DC output voltage $V_{out}$. A step-down ratio or a conversion ratio M is defined as follows: $M=V_{out}/V_{in}$.

The converter 2 comprises a first input voltage terminal $in_1$ and second input voltage terminal $in_2$ to apply the input voltage $V_{in}$. Furthermore, the converter 2 comprises a first output voltage terminal $out_1$ and a second output voltage terminal $out_2$ to provide the output voltage $V_{out}$ and an output current or load current $I_{load}$ to a load R. The converter 2 further comprises for reactive components, namely a flying capacitor $C_{fly}$, a capacitor C, a first inductor $L_1$ and a second inductor $L_2$.

In case that the converter 2 is operated as step-down converter 2, the first input voltage terminal $in_1$ is connected via a first switch $SW_1$ to a first node $N_1$. The first node $N_1$ is connected via the flying capacitor $C_{fly}$ to a second node $N_2$. The second node $N_2$ is connected via a second switch $SW_2$ to a reference node $N_0$. The second node $N_2$ further is connected via a third switch $SW_3$ to a third node $N_3$. The third node $N_3$ is connected via the inductor $L_1$ with the first output voltage terminal out. The first node $N_1$ is further connected via a fourth switch $SW_4$ to a fourth node $N_4$. Furthermore, the fourth node $N_4$ is connected via a fifth switch $SW_5$ to a fifth node $N_5$. The fifth node $N_5$ is further connected via the second inductor $L_2$ to the first output terminal $out_1$. The fifth node $N_5$ is connected via a sixth switch $SW_6$ to the reference node $N_0$. The third node $N_3$ is further connected via a seventh switch $SW_7$ to the fourth node $N_4$. The output capacitor C is arranged in parallel to the first output voltage terminal $out_1$ and the second output voltage terminal $out_2$. This means that the first output voltage terminal $out_1$ is connected via the output capacitor C with the second output voltage terminal $out_2$. The reference node $N_0$, the second input voltage terminal $in_2$ and the second output voltage terminal $out_2$ are connected to ground.

In case that the converter 2 is operated as step-up converter 2, the input voltage terminals $in_1$, $in_2$ and the output voltage terminals $out_1$, $out_2$ are exchanged. In this case the capacitor C is called input capacitor C.

The input voltage $V_{in}$ is measured by means of a first voltage sensor 4 and provided to an analog-to-digital converter 5. The analog-to-digital converter 5 transfers the input voltage $V_{in}$ into the digital domain and provides a digital input voltage signal $V'_{in}$ to the digital controller 3. Correspondingly, the output voltage $V_{out}$ is measured by a second voltage sensor 6 and provided to a further analog-to-digital converter 7. The analog-to-digital converter 7 transfers the output voltage $V_{out}$ into the digital domain and provides a digital output voltage signal $V'_{out}$ to the digital controller 3.

The digital controller 3 comprises a mode selection logic 8, switch operation means 9 and a digital voltage controller 10. The mode selection logic has three signal inputs to receive the input voltage $V'_{in}$, a required output voltage $V_{ref}$ and a required output current $I_{ref}$. The mode selection logic 8 generates a mode signal S to select a suitable operation mode from a group of a different operation modes depending on the input voltage $V'_{in}$, the required output voltage $V_{ref}$ and/or the required output current $I_{ref}$. For example, the mode selection logic 8 comprises a look-up table which generates the mode signal S dependent on the desired conversion ratio M and the load conditions which are characterized by the required output current $I_{ref}$. The switch operation means 9 are connected with the mode selection logic 8 to receive the mode signal S and to operate the switches $SW_1$ to $SW_7$ dependent on the selected operation mode.

The digital voltage controller 10 comprises a voltage compensator 11 which receives an output voltage error signal $e=V_{ref}-V'_{out}$. The voltage compensator 11 calculates a duty ratio D. The switch operation means 9 are connected to the digital voltage controller 10 to receive the duty ratio D and to operate the switches $SW_1$ to $SW_7$ dependent on the duty ratio D. The duty ratio D is the ratio between a desired pulse duration and a switching period $T_S$.

The switch operation means 9 are connected to the switches $SW_1$ to $SW_7$ and generate for each switch $SW_1$ to $SW_7$ a corresponding switching signal $G_1$ to $G_7$. The switches $SW_1$ to $SW_7$ are switched on or switched off depending on the signal level of the corresponding switching signal $G_1$ to $G_7$. The switches $SW_1$ to $SW_7$ are for example MOSFETs.

The switch operation means 9 comprise a first switching sequence to perform a first operation mode. This operation mode is called high step-down mode or HSD mode. The switching sequence of the HSD mode is as follows:

|       | $ST_1$ | $ST_2$ | $ST_3$ | $ST_4$ |
|-------|--------|--------|--------|--------|
| $SW_1$ | 1 | 0 | 0 | 0 |
| $SW_2$ | 0 | 1 | 1 | 1 |
| $SW_3$ | 1 | 1 | 1 | 1 |
| $SW_4$ | 0 | 0 | 1 | 0 |
| $SW_5$ | 0 | 1 | 1 | 1 |
| $SW_6$ | 1 | 1 | 0 | 1 |
| $SW_7$ | 1 | 1 | 0 | 1 | wherein $SW_1$ to $SW_7$ denote the mentioned seven switches and $ST_1$ to $ST_4$ denote four states of a switching cycle. Furthermore, 0 means OFF and 1 means ON.

Figure 2:
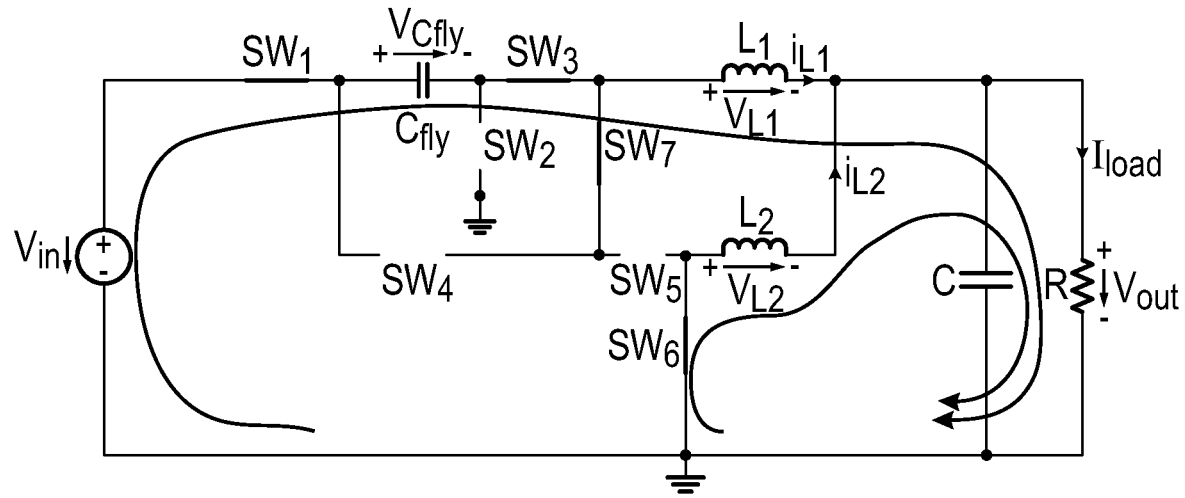
FIG. 2 is a view showing a first state of the converter in a high step-down mode.
Figure 3:
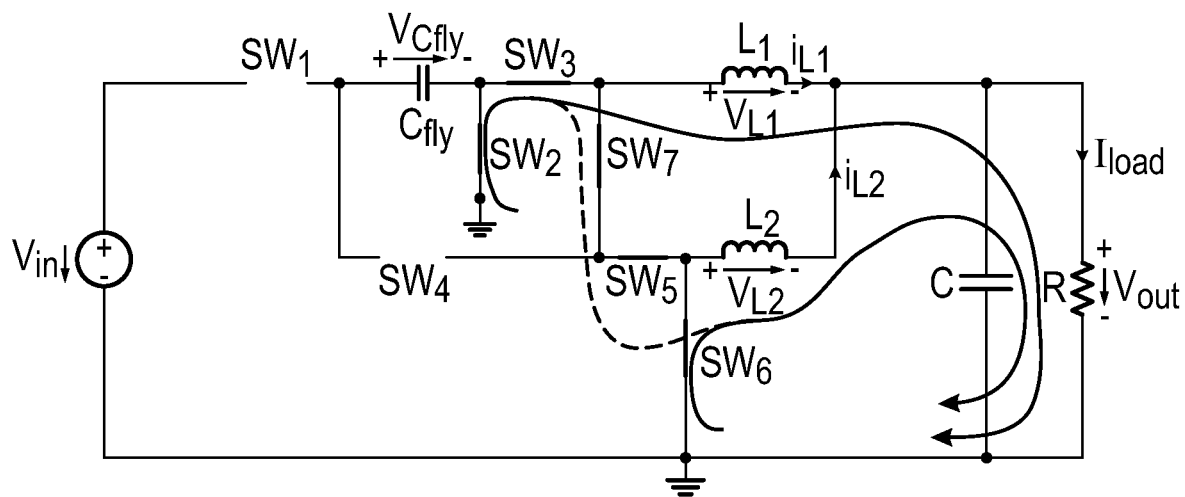
FIG. 3 is a view showing a second and a fourth state of the converter in the high step-down mode.
Figure 4:
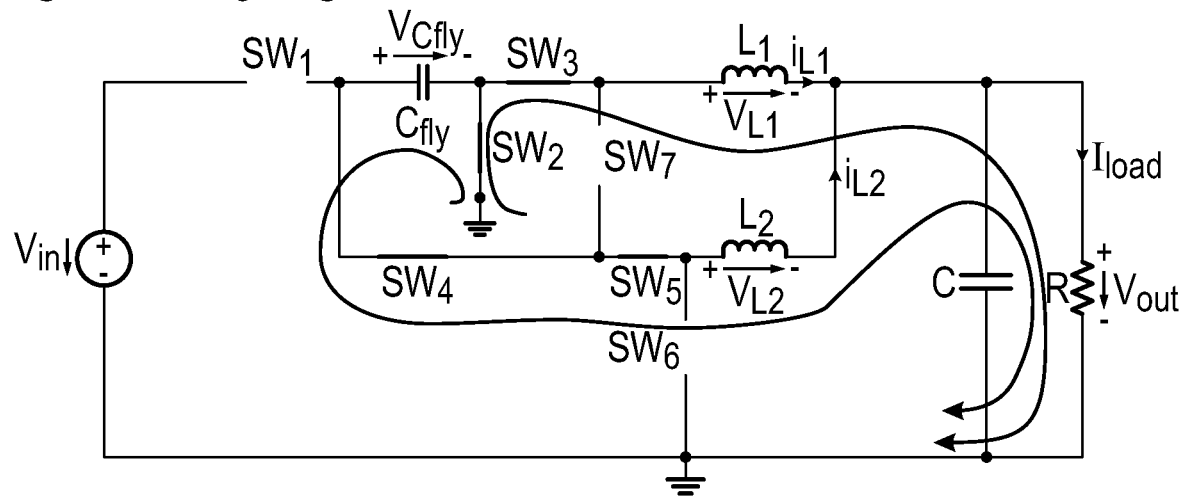
FIG. 4 is a view showing a third state of the converter in the high step-down mode.
Figure 5:
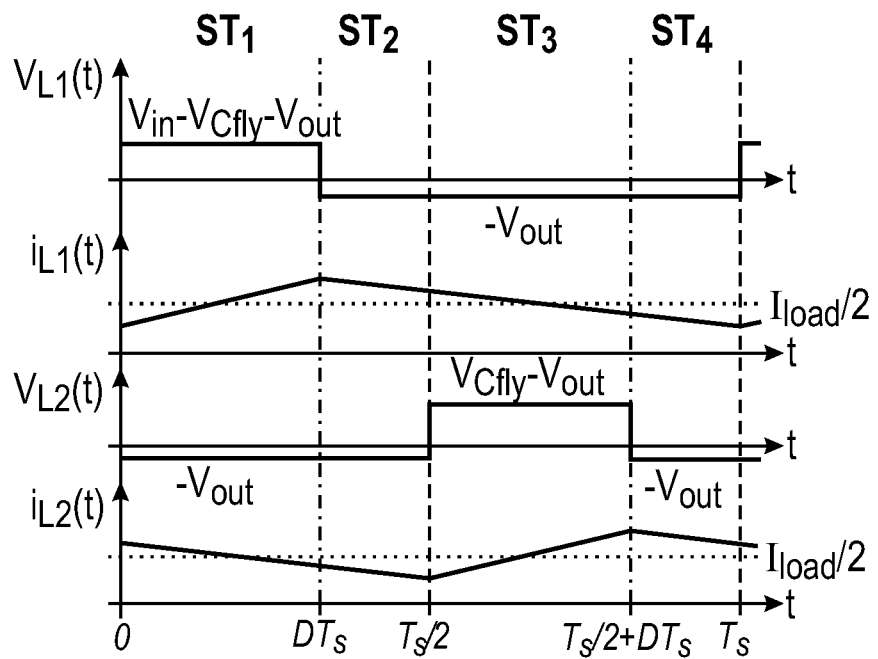
FIG. 5 is a view showing a time diagram of voltages and currents of the converter in the high step-down mode.

FIG. 2 to FIG. 4 show the converter 2 in the states 1 ($ST_1$) to 4 ($ST_4$) of the switching cycle. Furthermore, FIG. 5 shows a time diagram of the voltages $V_{L1}$ and $V_{L2}$ across the inductors $L_1$ and $L_2$ and of the currents $i_{L1}$ and $i_{L2}$ through the inductors $L_1$ and $L_2$. t denotes the time and $T_S$ the switching period of the switching cycle. The duration of the states 1 to 4 depends on the duty ratio D.

The HSD mode has a high power processing efficiency for high step-down ratios M under medium and heavy load conditions. In steady-state, the voltage $V_{Cfly}$ across the flying capacitor $C_{fly}$ is equal to half of the input voltage $V_{in}$. The switching sequence consists of the four states $ST_1$ to $ST_4$, where in state 1 the flying capacitor $C_{fly}$ and the inductor $L_1$ are charged with energy. State 2 is a synchronous rectification state. In this state 2 the inductor currents $i_{L1}$ and $i_{L2}$ are divided. Due to this current distribution the power losses are reduced. During state 3 the flying capacitor $C_{fly}$ is discharged and the inductor $L_2$ is charged. State 4 is a repetition of state 2.

The flying capacitor voltage $V_{Cfly}$ is maintained at $V_{in}/2$ by the two inductors $L_1$ and $L_2$ and the conversion ratio is M $(D)=V_{out}/V_{in}=D/2$. In the HSD mode the variations of the switching node voltages $V_{L1}$ and $V_{L2}$ are reduced by a half compared to a conventional two-phase interleaved buck converter, allowing for a significant reduction of the inductance value of the inductors $L_1$ and $L_2$. Since the capacitors $C_{fly}$ and C have up to three orders of magnitude smaller volume for the same amount of stored energy than the inductors $L_1$ and $L_2$ the overall volume of reactive components of the converter 2 is reduced compared to a conventional two-phase interleaved buck converter. In the HSD mode all switches $SW_1$ to $SW_7$ are blocking only a half of the input voltage $V_{in}$. This means that, if the same silicon area is used for the two implementations, both switching and conduction losses for semiconductor components of this topology could potentially be smaller than that of a conventional two-phase interleaved buck converter.

The switch operation means 9 further comprise a second switching sequence to perform a second operation mode. This second operation mode is called 3-level buck mode or 3LB mode. The switching sequence of the 3LB mode is as follows:

|        | $ST_1$ | $ST_2$ | $ST_3$ | $ST_4$ |
|--------|--------|--------|--------|--------|
| $SW_1$ | 1      | 0      | 0      | 0      |
| $SW_2$ | 0      | 1      | 1      | 1      |
| $SW_3$ | 1      | 1      | 0      | 1      |
| $SW_4$ | 0      | 0      | 1      | 0      |
| $SW_5$ | 1      | 1      | 1      | 1      |
| $SW_6$ | 0      | 1      | 0      | 1      |
| $SW_7$ | 1      | 1      | 1      | 1      | wherein $SW_1$ to $SW_7$ denote the mentioned seven switches and $ST_1$ to $ST_4$ denote four states of a switching cycle. Furthermore, 0 means OFF and 1 means ON.

Figure 6:
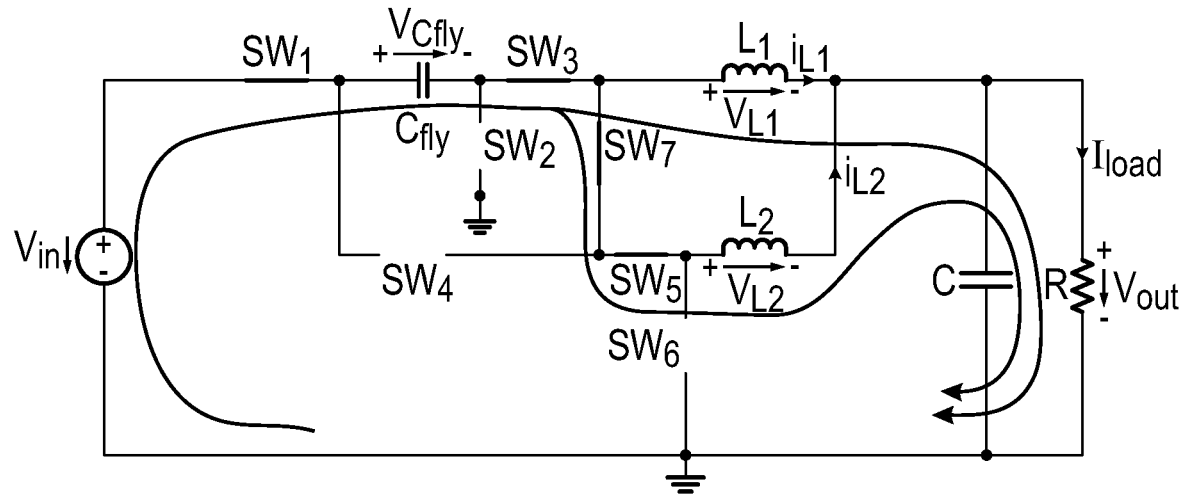
FIG. 6 is a view showing a first state of the converter in a 3-level buck mode.
Figure 7:
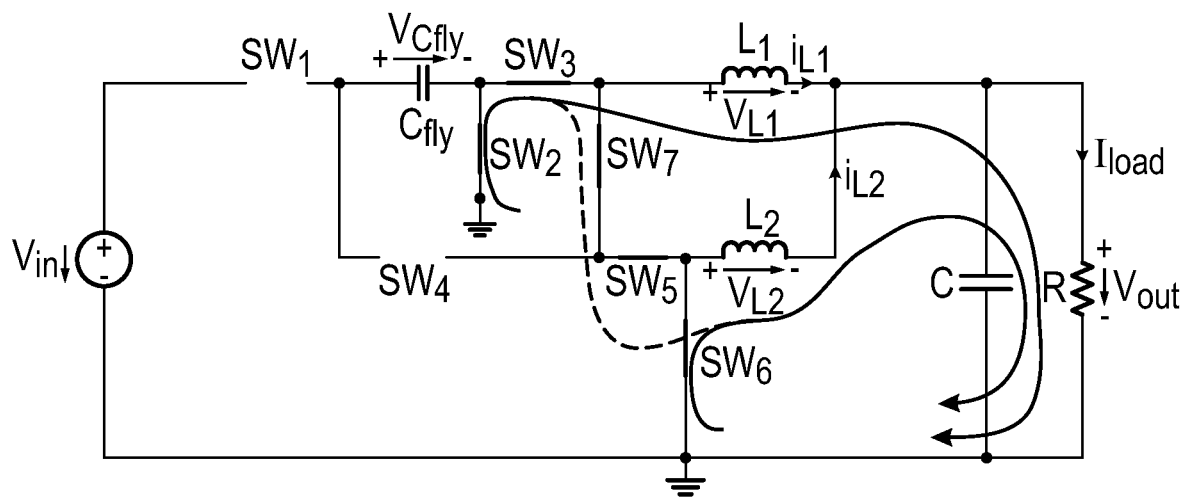
FIG. 7 is a view showing a second and a fourth state of the converter in the 3-level buck mode.
Figure 8:
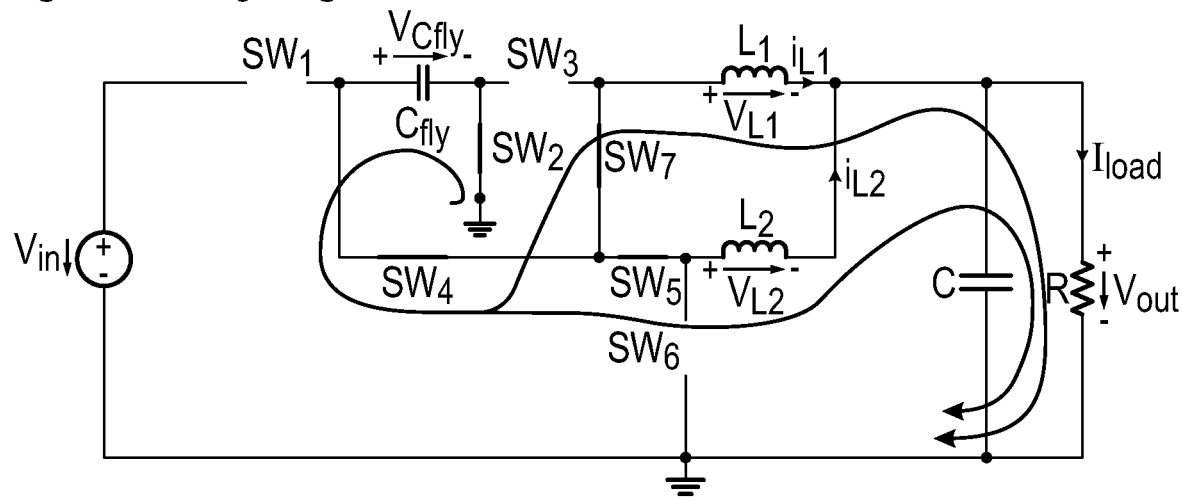
FIG. 8 is a view showing a third state of the converter in the 3-level buck mode.
Figure 9:
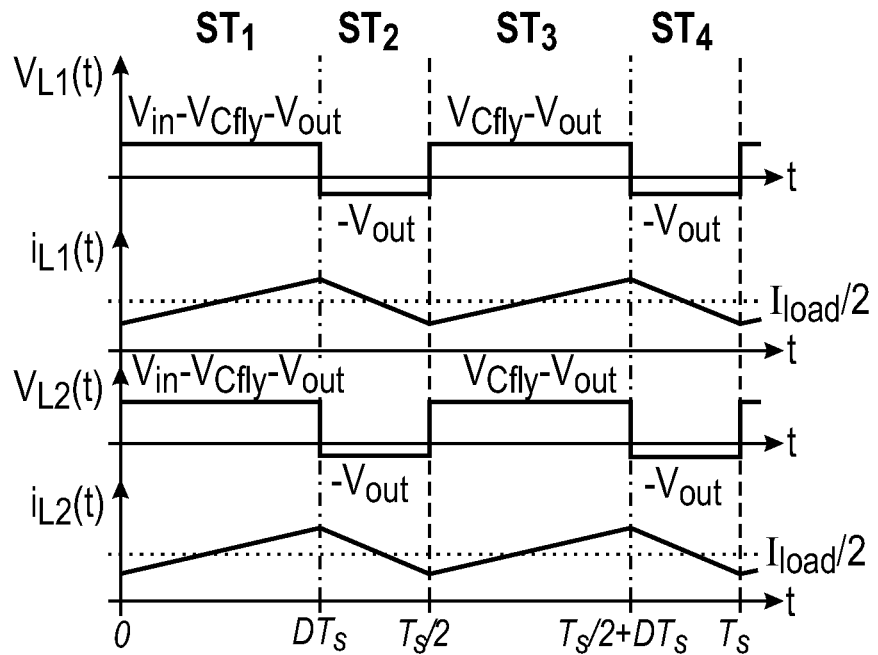
FIG. 9 is a view of a time diagram of voltages and currents of the converter in the 3-level buck mode.

FIG. 6 to 8 show states 1 ($ST_1$) to 4 ($ST_4$) of the converter 2 in the 3LB mode. Furthermore, FIG. 9 shows a time diagram of the voltages $V_{L1}$ and $V_{L2}$ across the inductors $L_1$ and $L_2$ and of the currents $i_{L1}$ and $i_{L2}$ through the inductors $L_1$ and $L_2$.

In state 1 the flying capacitor $C_{fly}$ is charged through the inductors $L_1$ and $L_2$. State 2 is a synchronous rectification state. In state 2 the inductor currents $i_{L1}$ and $i_{L2}$ are divided. In State 3 the flying capacitor $C_{fly}$ is discharged to maintain approximately a constant $V_{in}/2$ voltage level of $V_{Cfly}$. State 4 is a repetition of state 2.

The 3LB mode can be used under light load conditions, for cases when a high step-down conversion ratio M is required, for example M<0.5. In the 3LB mode switches $SW_5$ and $SW_7$ are turned on all the times and the inductors $L_1$ and $L_2$ are in parallel. This allows the output current $I_{load}$ to be split between the two inductors $L_1$ and $L_2$, reducing the volume requirement and the losses of the inductors $L_1$ and $L_2$. The 3LB mode operates with a range of the duty ratio D of 0<D<0.5 and a conversion ratio of M (D)=D. The switches $SW_1$ to $SW_7$ are switched at half of the input voltage $V_{in}$, reducing the switching losses.

The switch operation means 9 further comprise a third switching sequence to perform a third operation mode. This operation mode is called first two-phase interleaved buck mode or $IB_1$ mode. The switching sequence of $IB_1$ mode is as follows:

|        | $ST_1$ | $ST_2$ | $ST_3$ | $ST_4$ |
|--------|--------|--------|--------|--------|
| $SW_1$ | 1      | 1      | 1      | 1      |
| $SW_2$ | 1      | 1      | 1      | 1      |
| $SW_3$ | 0      | 0      | 0      | 1      |
| $SW_4$ | 1      | 1      | 1      | 1      |
| $SW_5$ | 1      | 0      | 1      | 1      |
| $SW_6$ | 0      | 1      | 0      | 0      |
| $SW_7$ | 1      | 1      | 1      | 0      | wherein $SW_1$ to $SW_7$ denote the mentioned seven switches and $ST_1$ to $ST_4$ denote four states of the switching cycle. Furthermore, 0 means OFF and 1 means ON. The $IB_1$ mode can mainly be used for conversion ratios M close to or greater than 0.5. The conversion ratio M for the $IB_1$ mode is M (D)=D, wherein for the duty ratio D applies: D>0.5.

Figure 10:
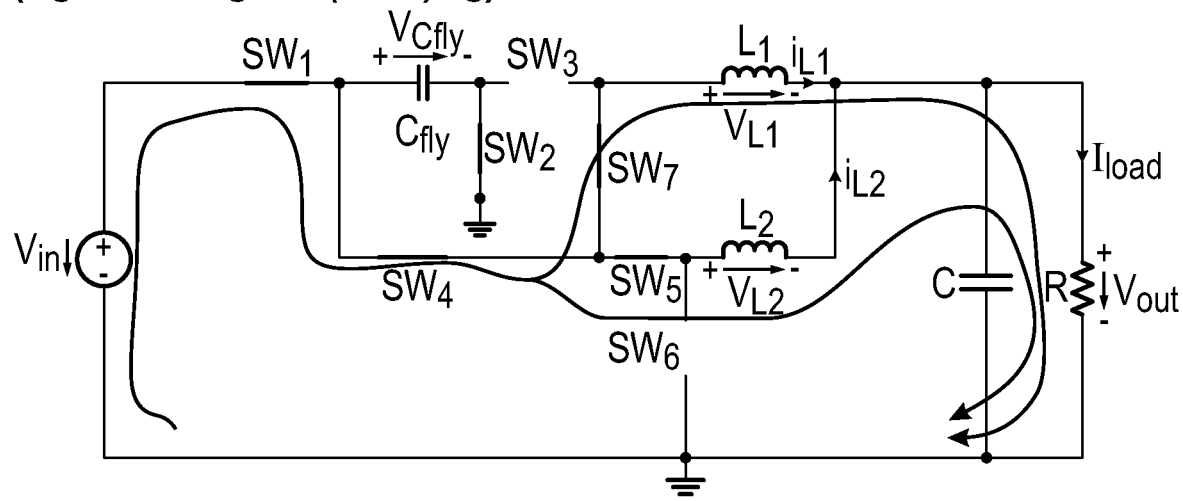
FIG. 10 is a view showing a first and a third state of the converter in a first two-phase interleaved buck mode.
Figure 11:
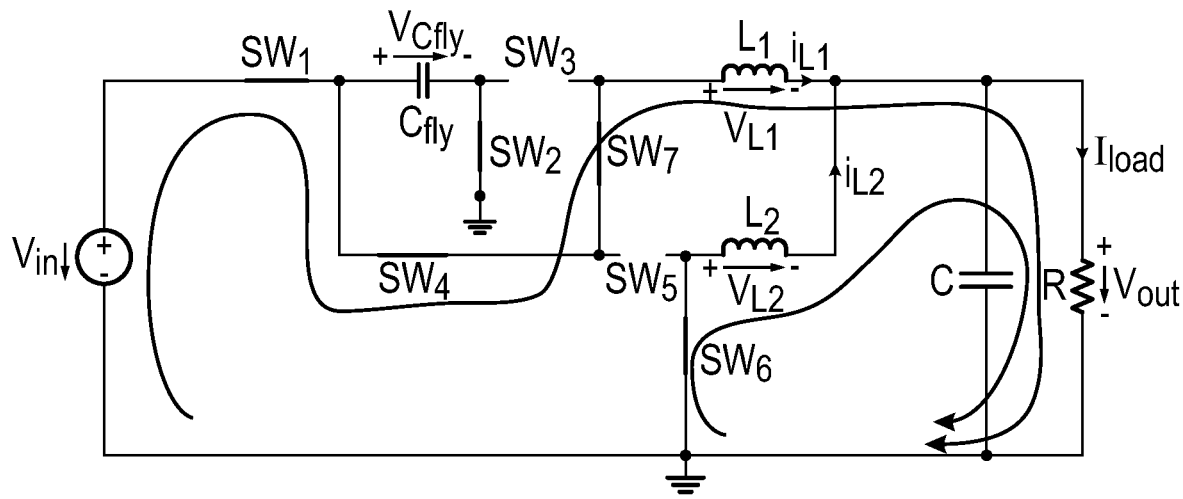
FIG. 11 is a view showing a second state of the converter in the first two-phase interleaved buck mode.
Figure 12:
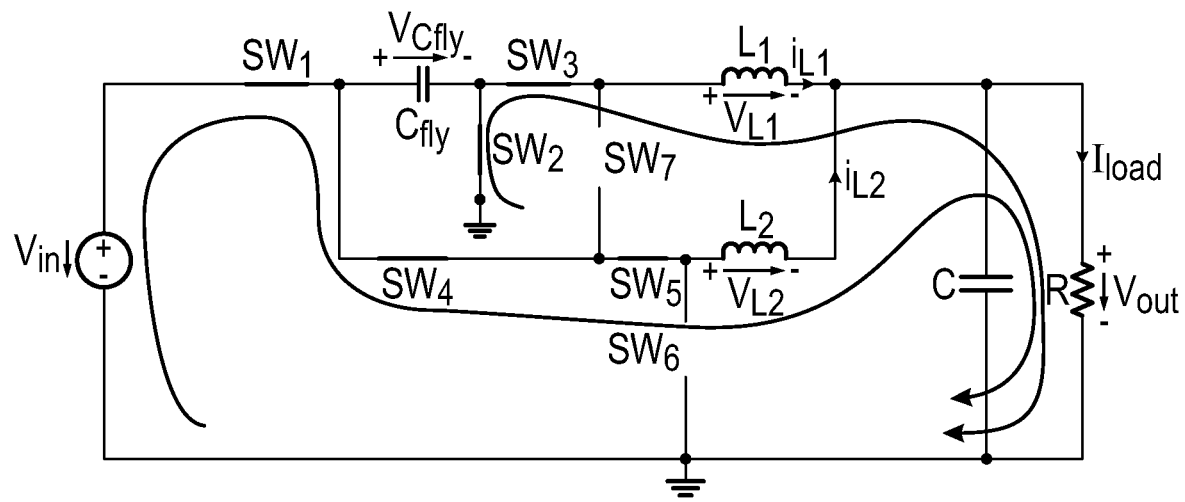
FIG. 12 is a view of a fourth state of the converter in the first two-phase interleaved buck mode.
Figure 13:
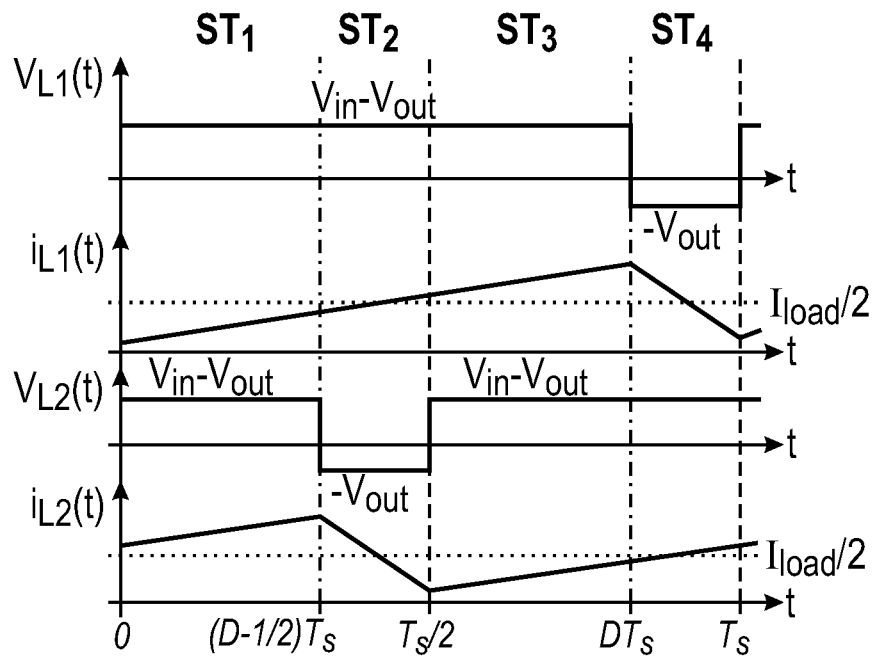
FIG. 13 is a view of a time diagram of voltages and currents of the converter in the first two-phase interleaved buck mode.

FIG. 10 to FIG. 12 show state 1 ($ST_1$) to state 4 ($ST_4$) of the converter 2 in the $IB_1$ mode. Furthermore, FIG. 13 shows a time diagram of the voltages $V_{L1}$ and $V_{L2}$ across the inductors $L_1$ and $L_2$ and the currents $i_{L1}$ and $i_{L2}$ through the inductors $L_1$ and $L_2$.

In state 1 both inductors $L_1$ and $L_2$ are charged with the input voltage $V_{in}$ at the nodes $N_3$ and $N_5$. In state 2 the inductor $L_1$ continues charging while the inductor $L_2$ is in synchronous rectification. State 3 is a repetition of state 1. In state 4 the inductor $L_2$ continues charging while the inductor $L_1$ is in synchronous rectification. To keep all of the switch ratings at $V_{in, max}/2$ this operation mode is used for $V_{in}<V_{in, max}/2$, where $V_{in, max}$ is the highest allowable input voltage for the converter 2. Since the switches $SW_1$, $SW_2$ and $SW_4$ remain on in states 1 to 4 the capacitor voltage $V_{Cfly}$ is held at the input voltage $V_{in}$.

The switch operation means 9 further comprise a fourth switching sequence to perform a fourth operation mode. This operation mode is called second two-phase interleaved buck mode or $IB_2$ mode. The switching sequence of the $IB_2$ mode is as follows:

|        | $ST_1$ | $ST_2$ | $ST_3$ | $ST_4$ |
|--------|--------|--------|--------|--------|
| $SW_1$ | 1      | 1      | 1      | 1      |
| $SW_2$ | 1      | 1      | 1      | 1      |
| $SW_3$ | 0      | 1      | 1      | 1      |
| $SW_4$ | 1      | 1      | 1      | 1      |
| $SW_5$ | 0      | 0      | 1      | 0      |
| $SW_6$ | 1      | 1      | 0      | 1      |
| $SW_7$ | 1      | 0      | 0      | 0      | wherein $SW_1$ to $SW_7$ denote the mentioned seven switches and $ST_1$ to $ST_4$ denote four states of a switching cycle.

Furthermore, 0 means OFF and 1 means ON. In general the $IB_2$ mode corresponds to the $IB_1$ mode, whereas for the duty ratio D applies: D<0.5.

Figure 14:
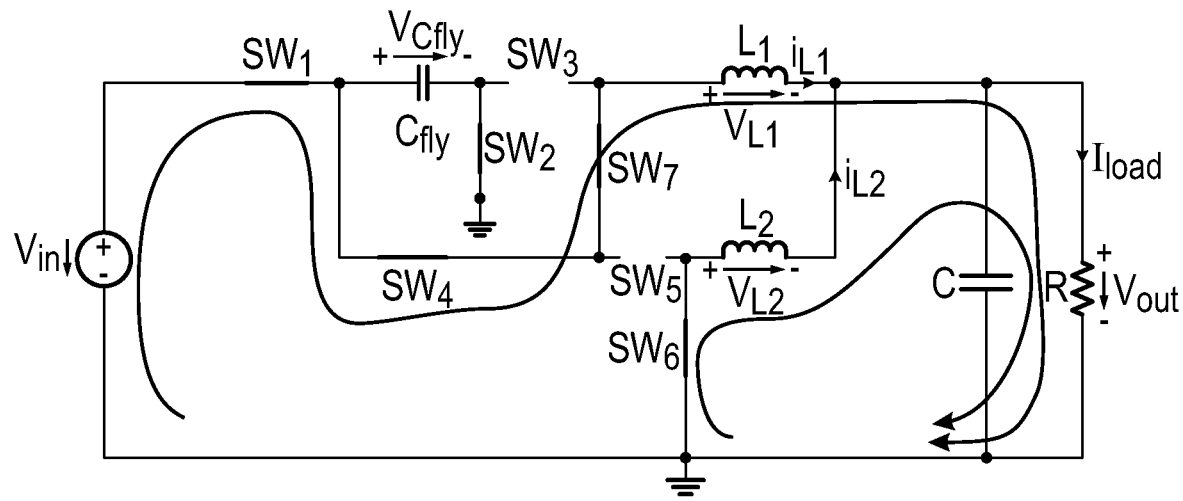
FIG. 14 is a view showing a first state of the converter in a second two-phase inter-leaved buck mode.
Figure 15:
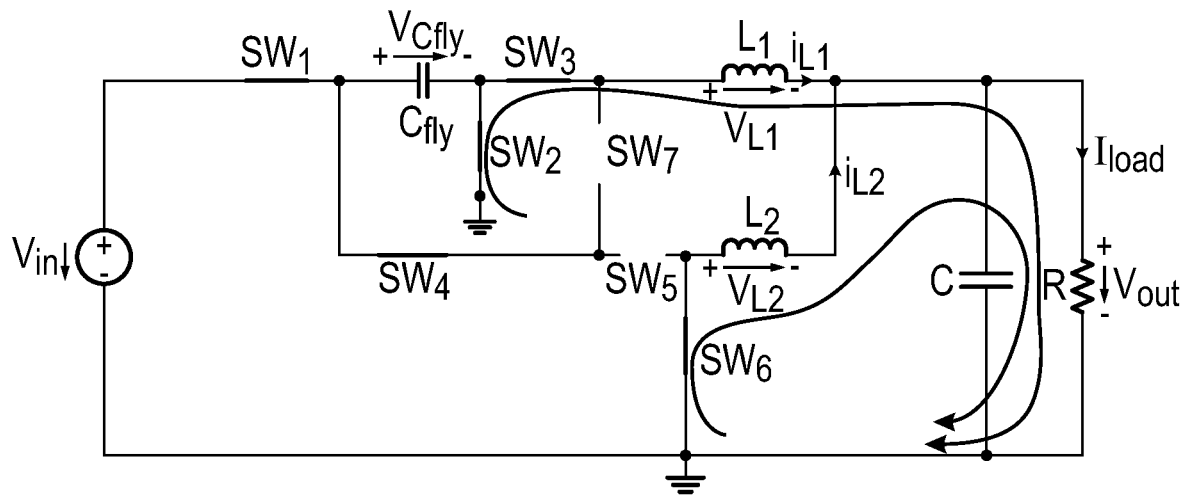
FIG. 15 is a view of a second state and a fourth state of the converter in the second two-phase interleaved buck mode.
Figure 16:
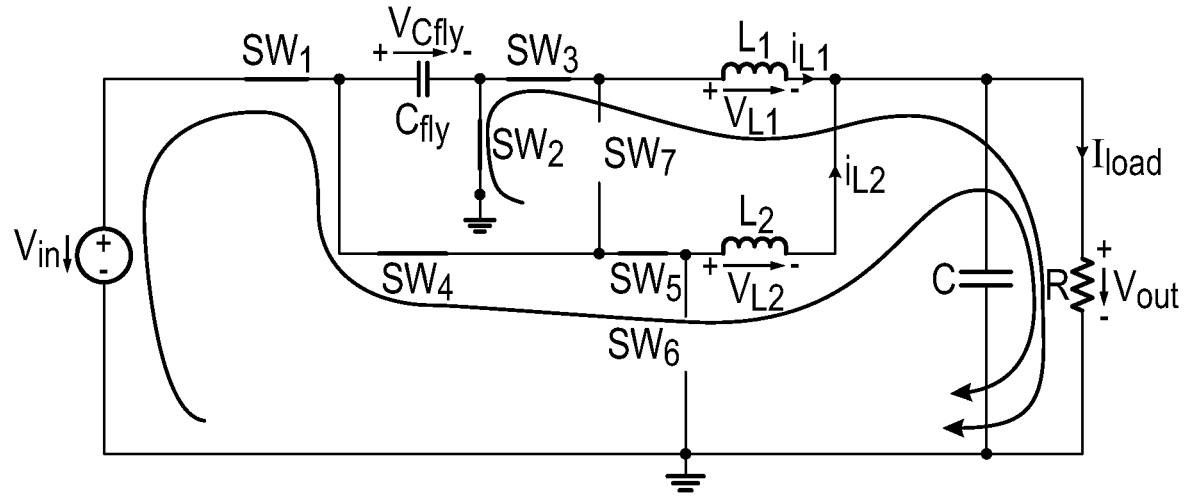
FIG. 16 is a view of a third state of the converter in the second two-phase interleaved buck mode.
Figure 17:
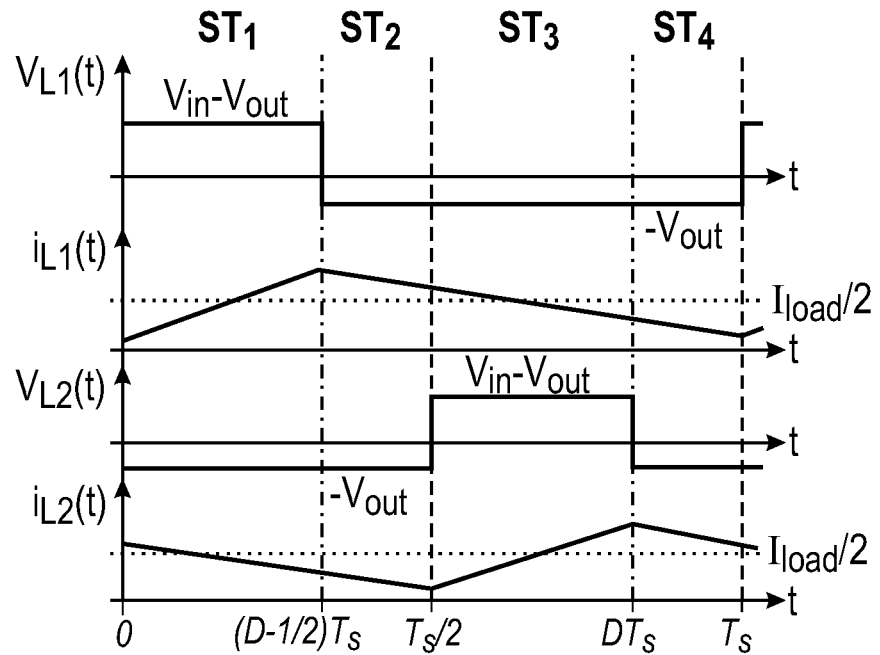
FIG. 17 is a view showing a time diagram of voltages and currents of the converter in the second two-phase interleaved buck mode.

FIG. 14 to FIG. 16 show state 1 ($ST_1$) to state 4 ($ST_4$) of the converter 2 in the $IB_2$ mode. Furthermore, FIG. 17 shows the voltages $V_{L1}$ and $V_{L2}$ across the inductors $L_1$ and $L_2$ and the currents $i_{L1}$ and $i_{L2}$ through the inductors $L_1$ and $L_2$. In state 2 and state 4 both inductors $L_1$ and $L_2$ are discharged. For further details it is referred to the description of the $IB_1$ mode.

The switch operation means 9 further comprise a fifth switching sequence to perform a fifth operation mode. This operation mode is called single-phase 3-level buck mode or SP3LB mode. The switching sequence of the SP3LB mode is as follows:

|  | $ST_1$ | $ST_2$ | $ST_3$ | $ST_4$ |
|---|---|---|---|---|
| $SW_1$ | 1 | 0 | 0 | 0 |
| $SW_2$ | 0 | 1 | 1 | 1 |
| $SW_3$ | 1 | 1 | 0 | 1 |
| $SW_4$ | 0 | 0 | 1 | 0 |
| $SW_5$ | 0 | 0 | 0 | 0 |
| $SW_6$ | 0 | 0 | 0 | 0 |
| $SW_7$ | 1 | 1 | 1 | 1 | wherein $SW_1$ to $SW_7$ denote the mentioned seven switches and $ST_1$ to $ST_4$ denote four states of the switching cycle. Furthermore, 0 means OFF and 1 means ON.

Figure 18:
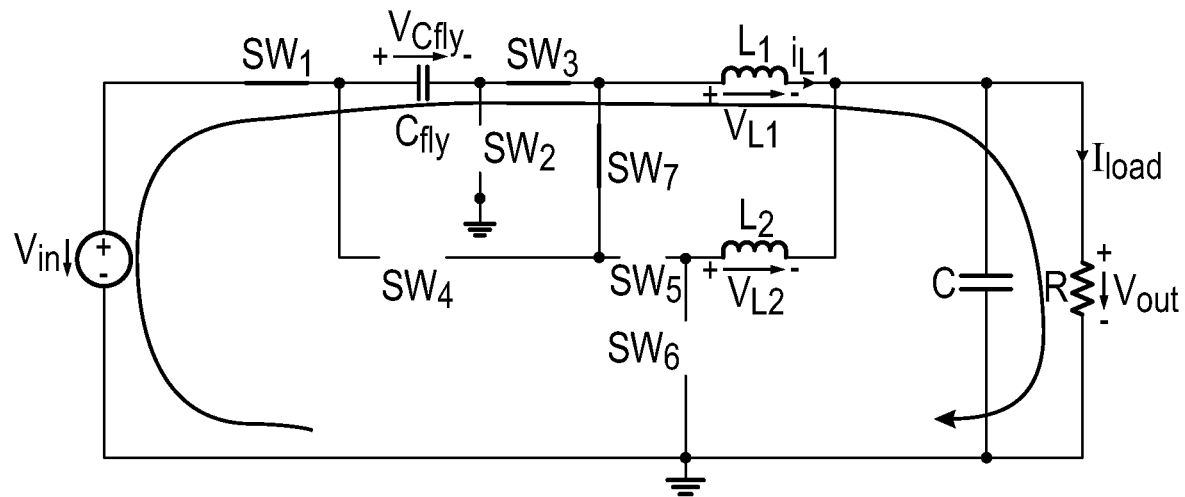
FIG. 18 is a view of a first state of the converter in a single-phase 3-level buck mode.
Figure 19:
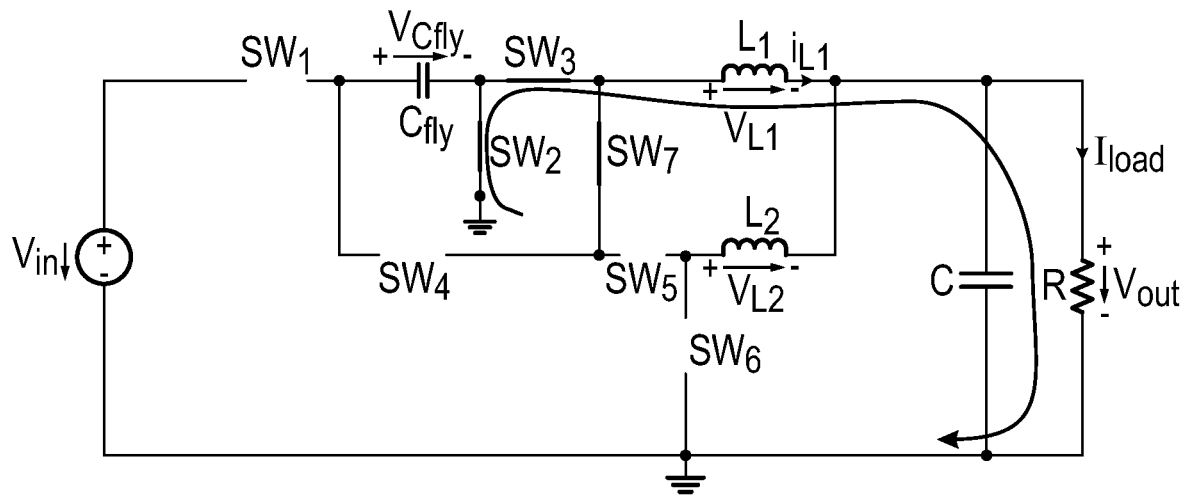
FIG. 19 is a view of a second state and a fourth state of the converter in the single-phase 3-level buck mode.
Figure 20:
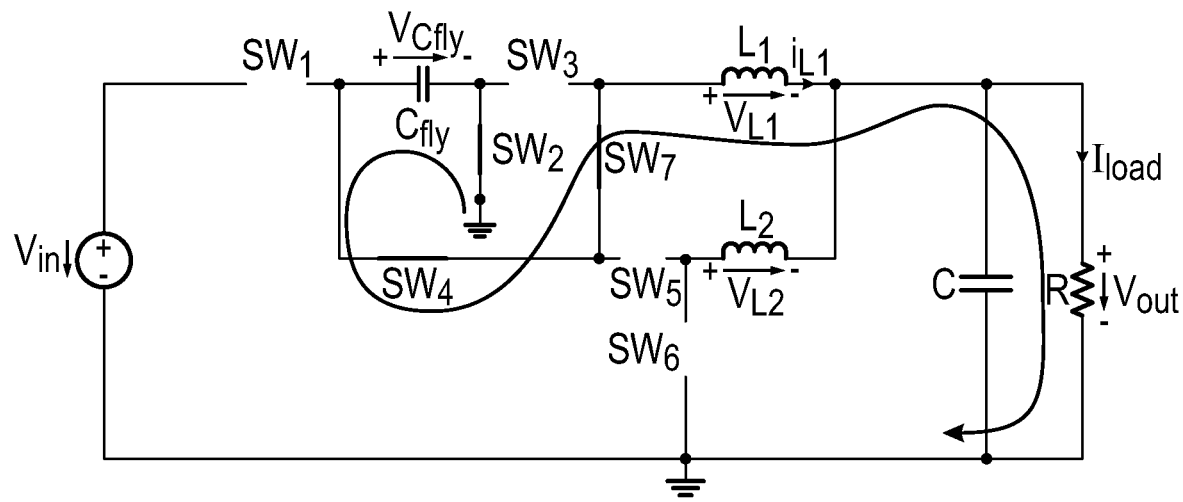
FIG. 20 is a view of a third state of the converter in the single-phase 3-level buck mode.
Figure 21:
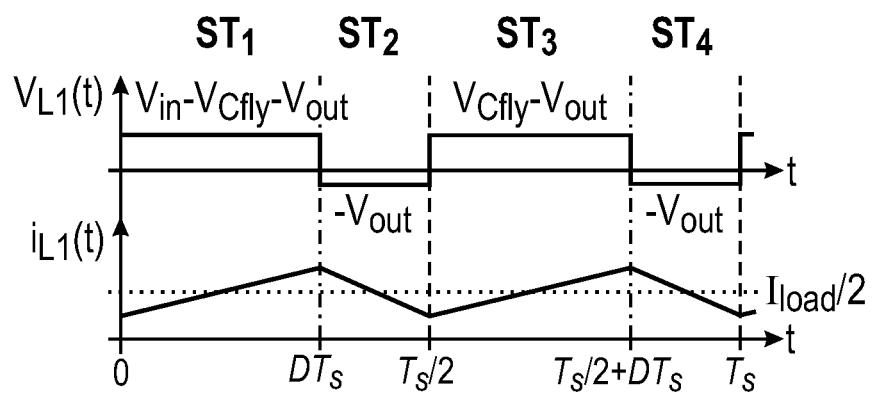
FIG. 21 is a view of a time diagram of a voltage and a current of the converter in the single-phase 3-level buck mode.

FIG. 18 to FIG. 20 show state 1 ($ST_1$) to state 4 ($ST_4$) of the converter 2 in the SP3LB mode. Furthermore, FIG. 21 shows the voltage $V_{L1}$ across the inductor $L_1$ and the current $i_{L1}$ through the inductor $L_1$. In general the SP3LB mode corresponds to the 3LB mode, however, the SP3LB mode uses phase shedding to further increase power processing efficiency at low currents. For further details it is referred to the description of the 3LB mode.

The switch operation means 9 further comprise a sixth switching sequence to perform a sixth operation mode. This operation mode is called single-phase interleaved buck mode or SPIB mode. The switching sequence of the SPIB mode is as follows:

|  | $ST_1$ | $ST_2$ |
|---|---|---|
| $SW_1$ | 1 | 1 |
| $SW_2$ | 1 | 1 |
| $SW_3$ | 0 | 1 |
| $SW_4$ | 1 | 1 |
| $SW_5$ | 0 | 0 |
| $SW_6$ | 0 | 0 |
| $SW_7$ | 1 | 0 | wherein $SW_1$ to $SW_7$ denote the mentioned seven switches and $ST_1$ and $ST_2$ denote two states of the switching cycle. Furthermore, 0 means OFF and 1 means ON.

Figure 22:
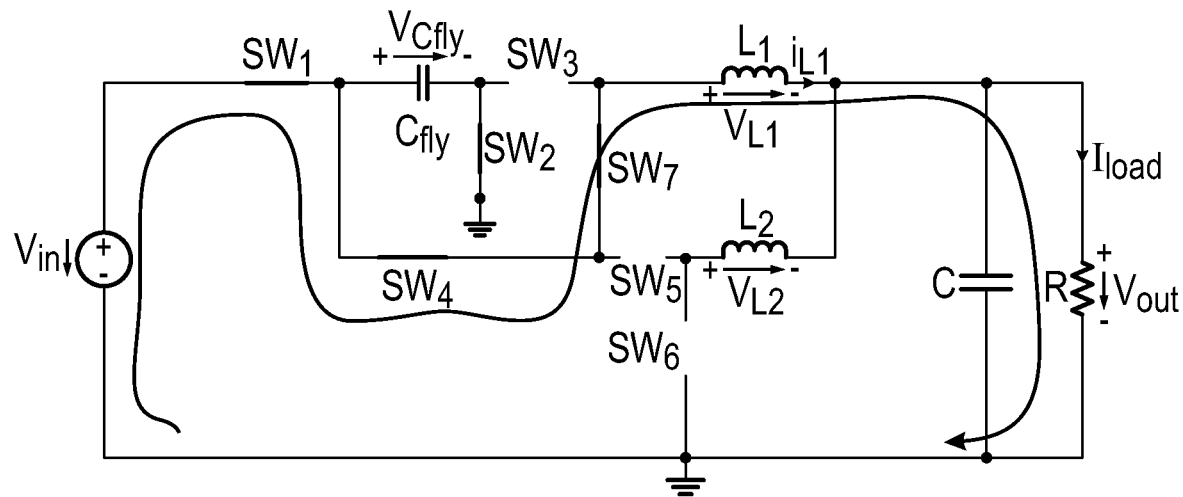
FIG. 22 is a view of a first state of the converter in a single-phase interleaved buck mode.
Figure 23:
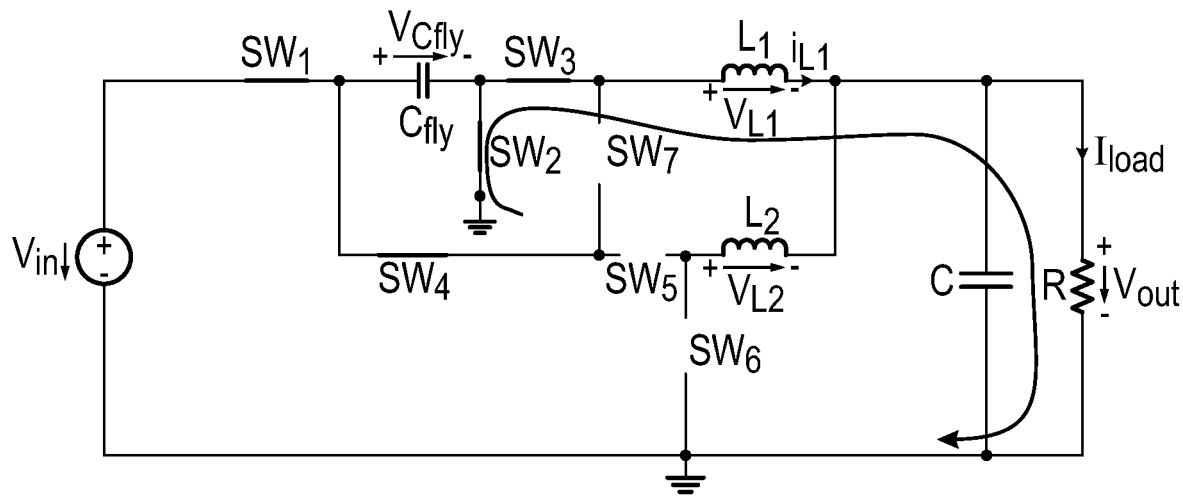
FIG. 23 is a view of a second state of the converter in the single-phase interleaved buck mode.
Figure 24:
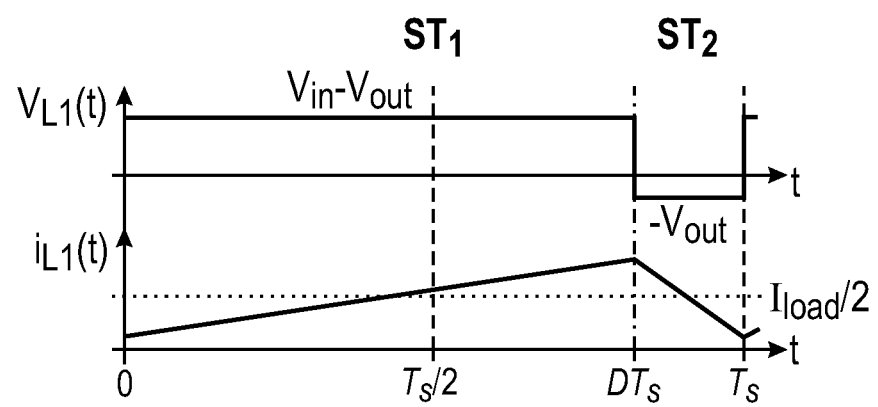
FIG. 24 is a view of a time diagram of a voltage and a current of the converter in the single-phase interleaved buck mode.

FIG. 22 and FIG. 23 show state 1 ($ST_1$) and state 2 ($ST_2$) of the converter 2 in the SPIB mode. Furthermore, FIG. 24 shows the voltage $V_{L1}$ across the inductor $L_1$ and the current $i_{L1}$ through the inductor $L_1$. In general the SPIB mode corresponds to state 1 and state 4 of the $IB_1$ mode, however, the SPIB mode uses phase shedding to further increase power processing efficiency at low currents. For further details it is referred to the description of the $IB_1$ mode.

The mode selection logic 8 determines depending on the input voltage $V'_{in}$, the required output voltage $V_{ref}$ and the required output current $I_{ref}$ a suitable operation mode. This suitable operation mode is selected from the operation modes mentioned before. For example, the mode selection logic 8 determines a suitable operation mode using a look-up table with predefined voltage thresholds and current thresholds such that the look-up table stores which modes have the highest efficiency for specific operating conditions. The mode selection logic 8 sends a corresponding mode signal S to the switch operation means 9 which contain the mentioned switching sequences for each operation mode. Using the duty ratio D from the voltage compensator 11 and the mode signal S from the mode selection logic 8, the switch operation means 9 operate the switches $SW_1$ to $SW_7$ accordingly. In addition, the voltage compensator 11 can be designed with different parameters depending on the operation mode, to achieve an optimized dynamic performance for each mode.

The converter device 1 is compared to a conventional two-phase interleaved buck converter as known from US 2008/0019158 A1. The switching frequency used for comparison is 800 kHz.

To compare the volume of the reactive components of the converter 2 to a conventional two-phase interleaved buck converter the energy storage requirements are compared. To achieve the same current ripple in the inductors, the inductance of the converter 2 can be reduced about 33%, resulting in smaller inductors $L_1$ and $L_2$. Furthermore, to achieve a desired output voltage deviation in response to a load transient, the required output capacitor C for the converter 2 can be about 33% smaller than the conventional two-phase interleaved buck converter to achieve the same transient performance.

To show the efficiency improvements of the converter device 1 over the conventional two-phase interleaved buck converter, the following three operation points are compared between the mentioned converters:

Operation point 1: $V_{in}$=12V and $V_{out}$=1V,
Operation point 2: $V_{in}$=12V and $V_{out}$=5V,
Operation point 3: $V_{in}$=36V and $V_{out}$=12V.

Figure 25:
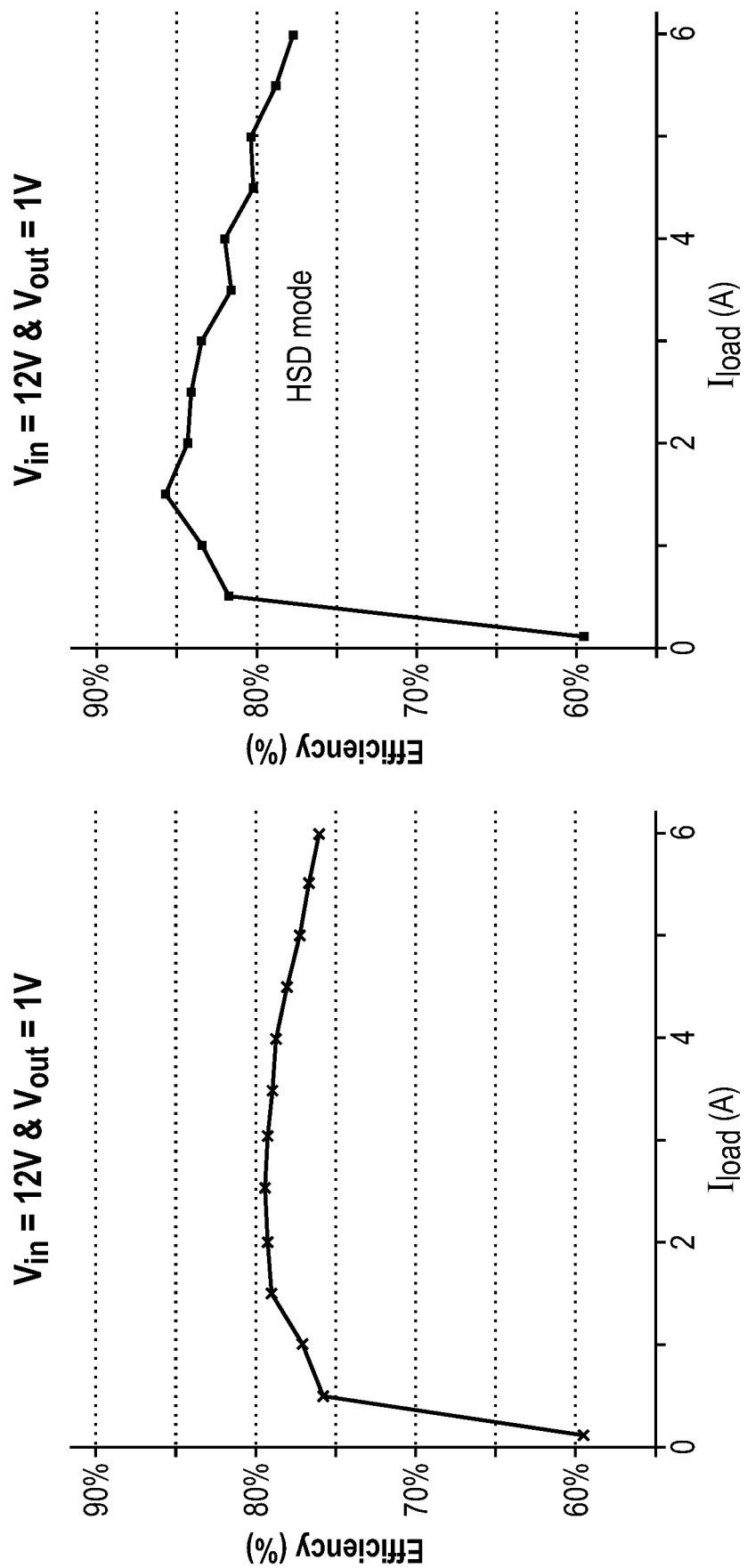
FIG. 25 is a view of efficiency curves of a conventional two-phase interleaved buck converter and the inventive converter for a first operating point.

FIG. 25 shows efficiency curves for the conventional two-phase interleaved buck converter (left side) and the converter 2 operating in the HSD mode (right side) for operation point 1. The purpose of the HSD mode is to achieve highest efficiency for high step-down ratios. At operation point 1 the HSD mode improves on the efficiency of the conventional two-phase interleaved buck converter for the entire range of load currents $I_{load}$. The HSD mode enables a loss reduction in the switching losses resulting in the improved efficiency.

Figure 26:
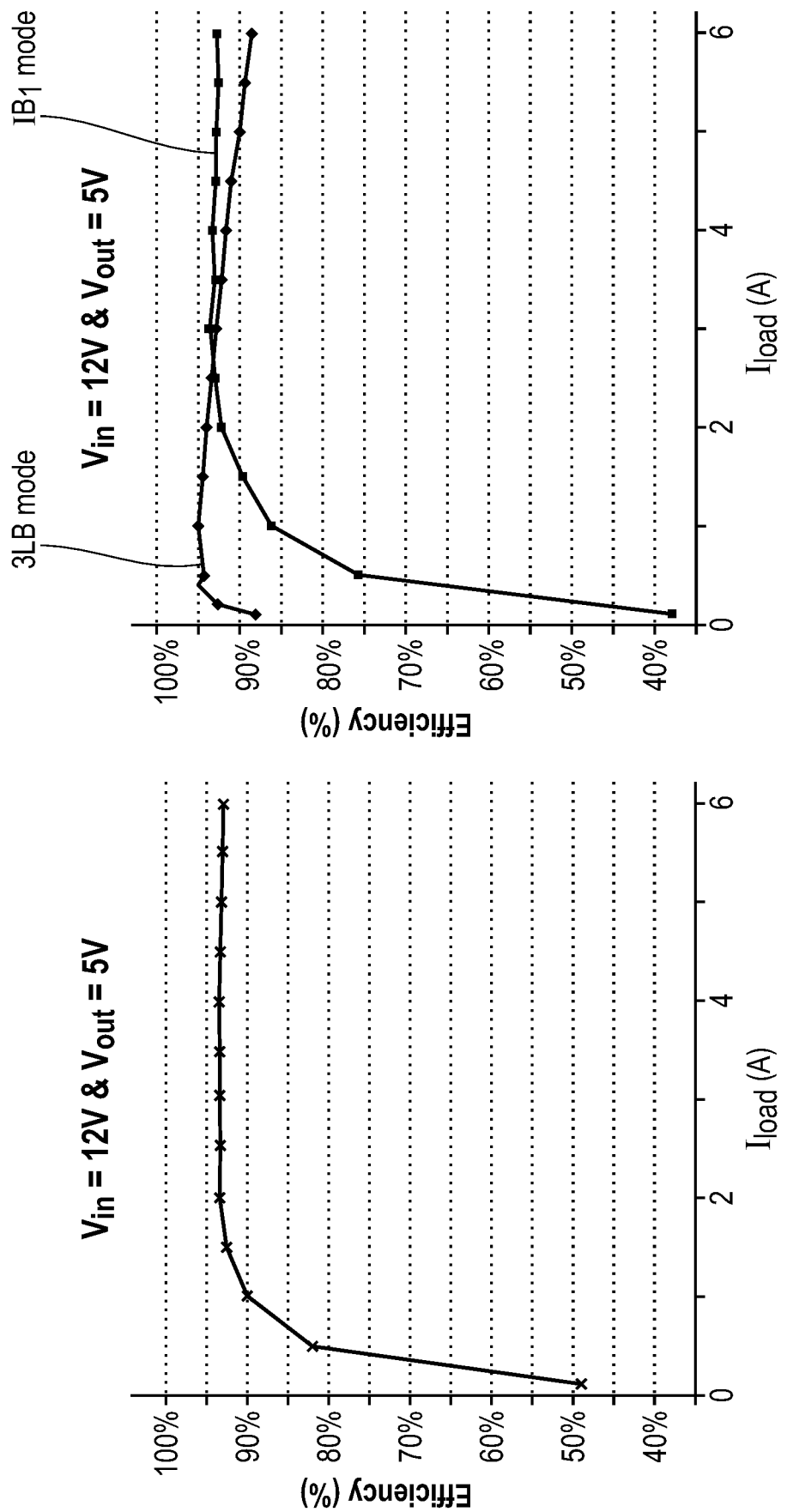
FIG. 26 is a view of efficiency curves of a conventional two-phase interleaved buck converter and the inventive converter for a second operating point.

FIG. 26 shows efficiency curves for the conventional two-phase interleaved buck converter (left side) and the 3LB mode and the $IB_1$ mode of the converter 2 (right side) for operation point 2. For operation point 2 the highest efficiency mode of the converter 2 depends on load currents $I_{load}$. At the low end of load currents, the 3LB mode has significantly higher efficiency compared to the conventional two-phase interleaved buck converter and compared to the $IB_1$ mode. As the load current is increased the $IB_1$ mode becomes the highest efficiency mode. For this segment of load currents the converter 2 achieves almost equivalent efficiency compared to the conventional two-phase interleaved buck converter. The slightly reduced efficiency is caused by higher conduction losses of the $IB_1$ mode compared to the conventional two-phase interleaved buck converter.

Figure 27:
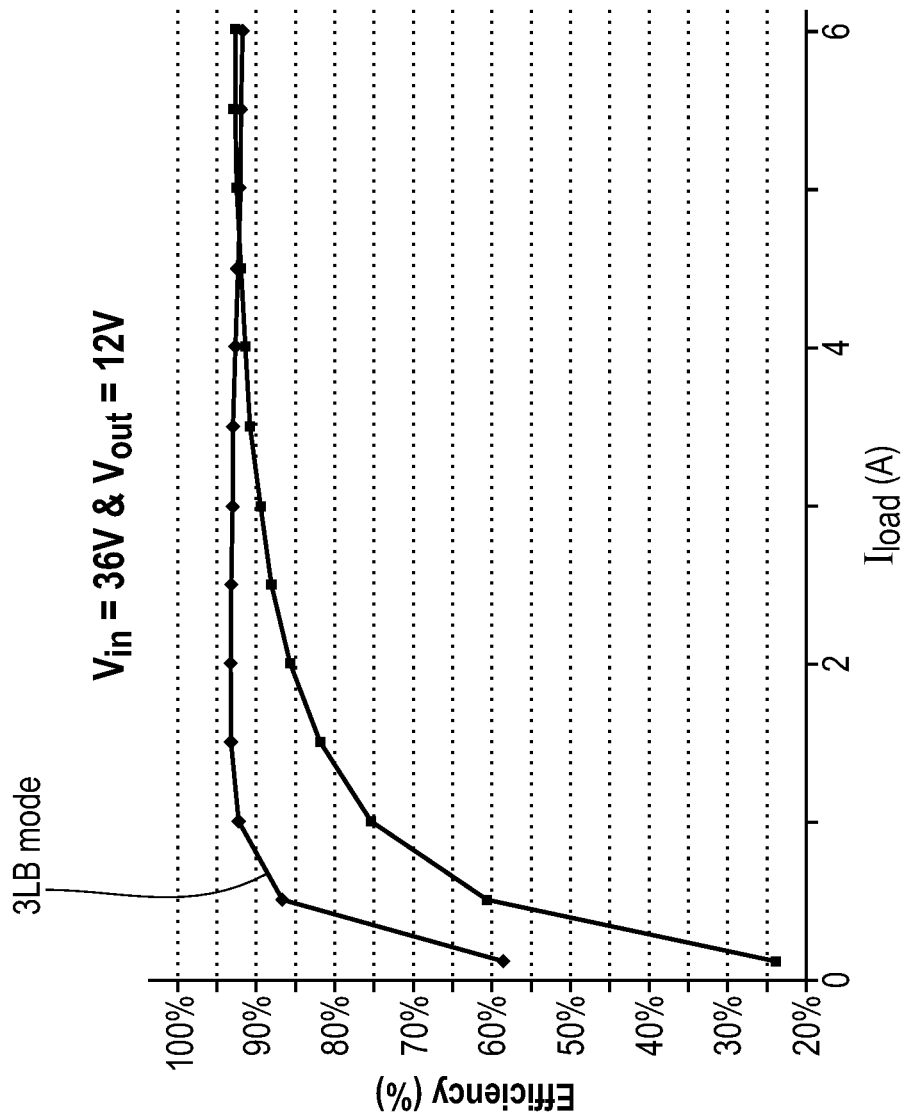
FIG. 27 is a view of efficiency curves of a conventional two-phase interleaved buck converter and the inventive converter for a third operating point.

FIG. 27 shows efficiency curves for the conventional two-phase interleaved buck converter and the 3LB mode of the converter 2 for operation point 3. The 3LB mode of the converter 2 has an improved efficiency at light and medium loads for high input voltages. This results from a reduced switch blocking voltage and voltage swing.

By properly selecting operation modes of the converter 2, efficiency improvements are achievable over the full operating range.

The converter device 1 provides a high power density wide-input DC-DC highly flexible converter topology for a wide range of point of load applications. The converter 2 is called 7-switch flying capacitor converter or 7SFC converter. The converter 2 requires much smaller inductors $L_1$ and $L_2$ compared to a conventional two-phase interleaved buck converter and, at the same time, improves power processing efficiency. These advantages are achieved by reducing the voltage swing across the inductors $L_1$ and $L_2$ and the voltage stress of all switches $SW_1$ to $SW_7$ to a half of the full input voltage for several operation modes. The converter device 1 has in summary the following advantages:

- multi-mode switch operation, in particular facilitated by the digital controller 3,
- operating point based efficiency optimization,
- significantly improved high step-down ratio efficiency over a conventional two-phase interleaved buck converter by significantly reducing switching losses,
- reduced inductor volume requirement,
- reduced output capacitor requirement,
- a reduced silicon area for the switches $SW_1$ to $SW_7$ compared to a conventional two-phase interleaved buck converter.

While specific embodiments of the invention have been shown and described in detail to illustrate the application of the principles of the invention, it will be understood that the invention may be embodied otherwise without departing from such principles.

The invention claimed is:

1. A converter device for converting an input voltage into an output voltage, the converter device comprising:
   a converter comprising a first input voltage terminal and a second input voltage terminal to apply the input voltage, a first output voltage terminal and a second output voltage terminal to provide the output voltage to a load and reactive components;
   a controller to operate the converter, the converter comprising seven switches to perform at least two different operation modes, the reactive components comprising a flying capacitor, the controller comprising a mode selection logic to select one of the at least two operation modes depending on desired operating conditions, wherein:
   a first switch of the seven switches is arranged between one of the first voltage terminals and a first node;
   a second switch of the seven switches is arranged between a second node and a reference node;
   a third switch of the seven switches is arranged between the second node and a third node;
   a fourth switch of the seven switches is arranged between the first node and a fourth node;
   a fifth switch of the seven switches is arranged between the fourth node and a fifth node;
   a sixth switch of the seven switches is arranged between the fifth node and the reference node; and
   a seventh switch of the seven switches is arranged between the third node and the fourth node.

2. The converter device according to claim 1, wherein the flying capacitor is arranged between the first node and the second node.

3. The converter device according to claim 1, wherein the reactive components comprise a first inductor arranged between the third node and the first voltage terminal and a second inductor arranged between the fifth node and the first voltage terminal.

4. The converter device according to claim 1, wherein the reactive components comprise a capacitor arranged in parallel to the first voltage terminal and the second voltage terminal.

5. The converter device according to claim 1, wherein the controller comprises a switch operation means connected with the mode selection logic for receiving a mode signal and for operating the seven switches based on a selected operation mode.

6. The converter device according to claim 5, wherein the controller comprises a digital controller, the digital controller comprising a voltage controller connected to the switch operation means to provide a duty ratio and to operate the seven switches based on the duty ratio.

7. The converter device according to claim 1, wherein the mode selection logic comprises at least three signal inputs to receive the input voltage, the first output voltage and an output current.

8. The converter device according to claim 5, wherein the switch operation means comprises a first switching sequence to perform a first operation mode as follows:

|        | $ST_1$ | $ST_2$ | $ST_3$ | $ST_4$ |
|--------|--------|--------|--------|--------|
| $SW_1$ | 1      | 0      | 0      | 0      |
| $SW_2$ | 0      | 1      | 1      | 1      |
| $SW_3$ | 1      | 1      | 1      | 1      |
| $SW_4$ | 0      | 0      | 1      | 0      |
| $SW_5$ | 0      | 1      | 1      | 1      |
| $SW_6$ | 1      | 1      | 0      | 1      |
| $SW_7$ | 1      | 1      | 0      | 1      | wherein:
$SW_1$ to $SW_7$ denote the seven switches;
$ST_1$ to $ST_4$ denote four states of a switching cycle; and
0 means OFF and 1 means ON.

9. The converter device according to claim 5, wherein the switch operation means comprises a second switching sequence to perform a second operation mode (3LB) as follows:

|        | $ST_1$ | $ST_2$ | $ST_3$ | $ST_4$ |
|--------|--------|--------|--------|--------|
| $SW_1$ | 1      | 0      | 0      | 0      |
| $SW_2$ | 0      | 1      | 1      | 1      |
| $SW_3$ | 1      | 1      | 0      | 1      |
| $SW_4$ | 0      | 0      | 1      | 0      |
| $SW_5$ | 1      | 1      | 1      | 1      |
| $SW_6$ | 0      | 1      | 0      | 1      |
| $SW_7$ | 1      | 1      | 1      | 1      | wherein:
$SW_1$ to $SW_7$ denote the seven switches;
$ST_1$ to $ST_4$ denote four states of a switching cycle; and
0 means OFF and 1 means ON.

10. The converter device according to claim 5, wherein the switch operation means comprises a third switching sequence to perform a third operation mode as follows:

|        | $ST_1$ | $ST_2$ | $ST_3$ | $ST_4$ |
|--------|--------|--------|--------|--------|
| $SW_1$ | 1      | 1      | 1      | 1      |
| $SW_2$ | 1      | 1      | 1      | 1      |
| $SW_3$ | 0      | 0      | 0      | 1      |
| $SW_4$ | 1      | 1      | 1      | 1      |

-continued

|  | $ST_1$ | $ST_2$ | $ST_3$ | $ST_4$ |
|---|---|---|---|---|
| $SW_5$ | 1 | 0 | 1 | 1 |
| $SW_6$ | 0 | 1 | 0 | 0 |
| $SW_7$ | 1 | 1 | 1 | 0 | wherein:
$SW_1$ to $SW_7$ denote the seven switches;
$ST_1$ to $ST_4$ denote four states of a switching cycle; and
0 means OFF and 1 means ON.

11. The converter device according to claim 5, wherein the switch operation means comprises a fourth switching sequence to perform a fourth operation mode as follows:

|  | $ST_1$ | $ST_2$ | $ST_3$ | $ST_4$ |
|---|---|---|---|---|
| $SW_1$ | 1 | 1 | 1 | 1 |
| $SW_2$ | 1 | 1 | 1 | 1 |
| $SW_3$ | 0 | 1 | 1 | 1 |
| $SW_4$ | 1 | 1 | 1 | 1 |
| $SW_5$ | 0 | 0 | 1 | 0 |
| $SW_6$ | 1 | 1 | 0 | 1 |
| $SW_7$ | 1 | 0 | 0 | 0 | wherein:
$SW_1$ to $SW_7$ denote the seven switches;
$ST_1$ to $ST_4$ denote four states of a switching cycle; and
0 means OFF and 1 means ON.

12. The converter device according to claim 5, wherein the switch operation means comprises a fifth switching sequence to perform a fifth operation mode as follows:

|  | $ST_1$ | $ST_2$ | $ST_3$ | $ST_4$ |
|---|---|---|---|---|
| $SW_1$ | 1 | 0 | 0 | 0 |
| $SW_2$ | 0 | 1 | 1 | 1 |
| $SW_3$ | 1 | 1 | 0 | 1 |
| $SW_4$ | 0 | 0 | 1 | 0 |
| $SW_5$ | 0 | 0 | 0 | 0 |
| $SW_6$ | 0 | 0 | 0 | 0 |
| $SW_7$ | 1 | 1 | 1 | 1 | wherein:
$SW_1$ to $SW_7$ denote the seven switches;
$ST_1$ to $ST_4$ denote four states of a switching cycle; and
0 means OFF and 1 means ON.

13. The converter device according to claim 5, wherein the switch operation means comprises a sixth switching sequence to perform a sixth operation mode as follows:

|  | $ST_1$ | $ST_2$ |
|---|---|---|
| $SW_1$ | 1 | 1 |
| $SW_2$ | 1 | 1 |
| $SW_3$ | 0 | 1 |
| $SW_4$ | 1 | 1 |
| $SW_5$ | 0 | 0 |
| $SW_6$ | 0 | 0 |
| $SW_7$ | 1 | 0 | wherein:
$SW_1$ to $SW_7$ denote the seven switches;
$ST_1$ and $ST_2$ denote two states of a switching cycle; and
0 means OFF and 1 means ON.

14. A method to operate a converter device, the method comprising the following steps:
providing a converter device for converting an input voltage into an output voltage, the converter device comprising a converter comprising a first input voltage terminal and a second input voltage terminal to apply the input voltage, a first output voltage terminal and a second output voltage terminal to provide the output voltage to a load and reactive components, the converter device further comprising a controller to operate the converter, the converter comprising seven switches to perform at least two different operation modes, the reactive components comprising a flying capacitor, the controller comprising a mode selection logic to select one of the at least two operation modes depending on desired operating conditions, wherein:
a first switch of the seven switches is arranged between one of the first voltage terminals and a first node;
a second switch of the seven switches is arranged between a second node and a reference node;
a third switch of the seven switches is arranged between the second node and a third node;
a fourth switch of the seven switches is arranged between the first node and a fourth node;
a fifth switch of the seven switches is arranged between the fourth node and a fifth node;
a sixth switch of the seven switches is arranged between the fifth node and the reference node; and
a seventh switch of the seven switches is arranged between the third node and the fourth node;
selecting one of the at least two operation modes via the mode selection logic depending on the desired operating conditions; and
operating the switches of the converter to perform a selected operation mode.

15. A converter device for converting an input voltage into an output voltage, the converter device comprising:
a converter comprising a first input voltage terminal and a second input voltage terminal to apply the input voltage, a first output voltage terminal and a second output voltage terminal to provide the output voltage to a load and reactive components;
a controller to operate the converter, the converter comprising seven switches to perform at least two different operation modes, the reactive components comprising a flying capacitor, the controller comprising a mode selection logic to select one of the at least two operation modes depending on desired operating conditions, the mode selection logic comprising at least three signal inputs to receive the input voltage, the first output voltage and an output current.

* * * * *